(12) United States Patent
Yamashita et al.

(10) Patent No.: US 6,747,693 B1
(45) Date of Patent: Jun. 8, 2004

(54) IMAGING APPARATUS AND METHOD WITH UPSIDE-DOWN MODE AND NORMAL MODE TRANSITIONING

(75) Inventors: Koichi Yamashita, Tokyo (JP); Takashi Itow, Tokyo (JP); Hiroaki Sugiura, Tokyo (JP); Tetsuya Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,201

(22) Filed: Dec. 15, 1999

(30) Foreign Application Priority Data

Mar. 9, 1999 (JP) .......................................... 11/061233

(51) Int. Cl.$^7$ ......................... H04N 5/228; H04N 5/262
(52) U.S. Cl. ............................. 348/222.1; 348/208.12; 348/240.2; 348/242; 382/297
(58) Field of Search ................. 348/208.12, 208.13, 348/222.1, 272, 280, 239, 333.01, 333.02, 333.12, 231.99, 240.99, 240.2; 358/906, 909.1; 396/373, 374; 382/293, 295–300; H04N 5/228, 5/262

(56) References Cited

U.S. PATENT DOCUMENTS

| | | | | |
|---|---|---|---|---|
| 5,270,831 A | * | 12/1993 | Parulski | 358/403 |
| 5,798,750 A | * | 8/1998 | Ozaki | 345/656 |
| 5,850,487 A | * | 12/1998 | Takane | 382/298 |
| 5,900,909 A | * | 5/1999 | Parulski | 348/239 |
| 6,011,585 A | * | 1/2000 | Anderson | 382/296 |
| 6,148,149 A | * | 11/2000 | Kagle | 348/231.99 |
| 6,262,769 B1 | * | 7/2001 | Anderson | 348/333.1 |
| 6,377,302 B1 | * | 4/2002 | Ozaki | 348/231.99 |

FOREIGN PATENT DOCUMENTS

JP A-11 32259 2/1999 .......... H04N/5/335

* cited by examiner

*Primary Examiner*—Ngoc-Yen Vu
(74) *Attorney, Agent, or Firm*—Birch, Stewart, Kolasch & Birch, LLP

(57) ABSTRACT

An image-processing apparatus operates in different orientations, producing a source image that may be either right-side up or upside down. The source image is stored in a memory circuit, read from the memory circuit on one order if right-side up, and read from the memory circuit in a different order if upside down, generating an output image that is always right-side up.

16 Claims, 22 Drawing Sheets

FIG. 4

| WRITE | PIXEL NO. | | | | | | | | | |
|---|---|---|---|---|---|---|---|---|---|---|
| | 0 | 1 | 2 | 3 | 4 | 5 | 6 | 7 | 8 | 9 |
| LINE NO. 0 | 0 | 1 | 2 | 3 | 4 | 5 | 6 | 7 | 8 | 9 |
| 1 | 10 | 11 | 12 | 13 | 14 | 15 | 16 | 17 | 18 | 19 |
| 2 | 20 | 21 | 22 | 23 | 24 | 25 | 26 | 27 | 28 | 29 |
| 3 | 30 | 31 | 32 | 33 | 34 | 35 | 36 | 37 | 38 | 39 |
| 4 | 40 | 41 | 42 | 43 | 44 | 45 | 46 | 47 | 48 | 49 |
| 5 | 50 | 51 | 52 | 53 | 54 | 55 | 56 | 57 | 58 | 59 |
| 6 | 60 | 61 | 62 | 63 | 64 | 65 | 66 | 67 | 68 | 69 |
| 7 | 70 | 71 | 72 | 73 | 74 | 75 | 76 | 77 | 78 | 79 |
| 8 | 80 | 81 | 82 | 83 | 84 | 85 | 86 | 87 | 88 | 89 |
| 9 | 90 | 91 | 92 | 93 | 94 | 95 | 96 | 97 | 98 | 99 |

FIG. 5

| | | COLUMN ADDRESS | | | | | | | | | |
|---|---|---|---|---|---|---|---|---|---|---|---|
| | | 0 | 1 | 2 | 3 | 4 | 5 | 6 | 7 | 8 | 9 |
| ROW ADDRESS | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 20 | 21 | 22 | 23 | 24 | 25 | 26 | 27 | 28 | 29 |
| | 3 | 30 | 31 | 32 | 33 | 34 | 35 | 36 | 37 | 38 | 39 |
| | 4 | 40 | 41 | 42 | 43 | 44 | 45 | 46 | 47 | 48 | 49 |
| | 5 | 50 | 51 | 52 | 53 | 54 | 55 | 56 | 57 | 58 | 59 |
| | 6 | 60 | 61 | 62 | 63 | 64 | 65 | 66 | 67 | 68 | 69 |
| | 7 | 70 | 71 | 72 | 73 | 74 | 75 | 76 | 77 | 78 | 79 |
| | 8 | 80 | 81 | 82 | 83 | 84 | 85 | 86 | 87 | 88 | 89 |
| | 9 | 90 | 91 | 92 | 93 | 94 | 95 | 96 | 97 | 98 | 99 |
| | 10 | 100 | 101 | 102 | 103 | 104 | 105 | 106 | 107 | 108 | 109 |
| | 11 | 110 | 111 | 112 | 113 | 114 | 115 | 116 | 117 | 118 | 119 |
| | 12 | 120 | 121 | 122 | 123 | 124 | 125 | 126 | 127 | 128 | 129 |
| | 13 | 130 | 131 | 132 | 133 | 134 | 135 | 136 | 137 | 138 | 139 |
| | 14 | 140 | 141 | 142 | 143 | 144 | 145 | 146 | 147 | 148 | 149 |
| | 15 | 150 | 151 | 152 | 153 | 154 | 155 | 156 | 157 | 158 | 159 |
| | 16 | 160 | 161 | 162 | 163 | 164 | 165 | 166 | 167 | 168 | 169 |
| | 17 | 170 | 171 | 172 | 173 | 174 | 175 | 176 | 177 | 178 | 179 |
| | 18 | 180 | 181 | 182 | 183 | 184 | 185 | 186 | 187 | 188 | 189 |
| | 19 | 190 | 191 | 192 | 193 | 194 | 195 | 196 | 197 | 198 | 199 |
| | 20 | 200 | 201 | 202 | 203 | 204 | 205 | 206 | 207 | 208 | 209 |
| | 21 | 210 | 211 | 212 | 213 | 214 | 215 | 216 | 217 | 218 | 219 |
| | 22 | 220 | 221 | 222 | 223 | 224 | 225 | 226 | 227 | 228 | 229 |
| | 23 | 230 | 231 | 232 | 233 | 234 | 235 | 236 | 237 | 238 | 239 |
| | 24 | 240 | 241 | 242 | 243 | 244 | 245 | 246 | 247 | 248 | 249 |
| | 25 | 250 | 251 | 252 | 253 | 254 | 255 | 256 | 257 | 258 | 259 |
| | 26 | 260 | 261 | 262 | 263 | 264 | 265 | 266 | 267 | 268 | 269 |
| | 27 | 270 | 271 | 272 | 273 | 274 | 275 | 276 | 277 | 278 | 279 |
| | 28 | 280 | 281 | 282 | 283 | 284 | 285 | 286 | 287 | 288 | 289 |
| | 29 | 290 | 291 | 292 | 293 | 294 | 295 | 296 | 297 | 298 | 299 |
| | 30 | 300 | 301 | 302 | 303 | 304 | 305 | 306 | 307 | 308 | 309 |
| | 31 | 310 | 311 | 312 | 313 | 314 | 315 | 316 | 317 | 318 | 319 |
| | 32 | 320 | 321 | 322 | 323 | 324 | 325 | 326 | 327 | 328 | 329 |
| | 33 | 330 | 331 | 332 | 333 | 334 | 335 | 336 | 337 | 338 | 339 |
| | 34 | 340 | 341 | 342 | 343 | 344 | 345 | 346 | 347 | 348 | 349 |
| | 35 | 350 | 351 | 352 | 353 | 354 | 355 | 356 | 357 | 358 | 359 |
| | 36 | 360 | 361 | 362 | 363 | 364 | 365 | 366 | 367 | 368 | 369 |
| | 37 | 370 | 371 | 372 | 373 | 374 | 375 | 376 | 377 | 378 | 379 |
| | 38 | 380 | 381 | 382 | 383 | 384 | 385 | 386 | 387 | 388 | 389 |
| | 39 | 390 | 391 | 392 | 393 | 394 | 395 | 396 | 397 | 398 | 399 |

FIG. 6

| WRITE | PIXEL NO. | | | | | | | | | |
|---|---|---|---|---|---|---|---|---|---|---|
| | | 0 | 1 | 2 | 3 | 4 | 5 | 6 | 7 | 8 | 9 |
| LINE NO. | 0 | 200 | 201 | 202 | 203 | 204 | 205 | 206 | 207 | 208 | 209 |
| | 1 | 210 | 211 | 212 | 213 | 214 | 215 | 216 | 217 | 218 | 219 |
| | 2 | 220 | 221 | 222 | 223 | 224 | 225 | 226 | 227 | 228 | 229 |
| | 3 | 230 | 231 | 232 | 233 | 234 | 235 | 236 | 237 | 238 | 239 |
| | 4 | 240 | 241 | 242 | 243 | 244 | 245 | 246 | 247 | 248 | 249 |
| | 5 | 250 | 251 | 252 | 253 | 254 | 255 | 256 | 257 | 258 | 259 |
| | 6 | 260 | 261 | 262 | 263 | 264 | 265 | 266 | 267 | 268 | 269 |
| | 7 | 270 | 271 | 272 | 273 | 274 | 275 | 276 | 277 | 278 | 279 |
| | 8 | 280 | 281 | 282 | 283 | 284 | 285 | 286 | 287 | 288 | 289 |
| | 9 | 290 | 291 | 292 | 293 | 294 | 295 | 296 | 297 | 298 | 299 |

FIG. 7

| READ | PIXEL NO. | | | | | | | | | |
|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 20 | 21 | 22 | 23 | 24 | 25 | 26 | 27 | 28 | 29 |
| | 3 | 30 | 31 | 32 | 33 | 34 | 35 | 36 | 37 | 38 | 39 |
| | 4 | 40 | 41 | 42 | 43 | 44 | 45 | 46 | 47 | 48 | 49 |
| | 5 | 50 | 51 | 52 | 53 | 54 | 55 | 56 | 57 | 58 | 59 |
| | 6 | 60 | 61 | 62 | 63 | 64 | 65 | 66 | 67 | 68 | 69 |
| | 7 | 70 | 71 | 72 | 73 | 74 | 75 | 76 | 77 | 78 | 79 |
| | 8 | 80 | 81 | 82 | 83 | 84 | 85 | 86 | 87 | 88 | 89 |
| | 9 | 90 | 91 | 92 | 93 | 94 | 95 | 96 | 97 | 98 | 99 |

FIG. 8

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 99 | 98 | 97 | 96 | 95 | 94 | 93 | 92 | 91 | 90 |
| | 1 | 89 | 88 | 87 | 86 | 85 | 84 | 83 | 82 | 81 | 80 |
| | 2 | 79 | 78 | 77 | 76 | 75 | 74 | 73 | 72 | 71 | 70 |
| | 3 | 69 | 68 | 67 | 66 | 65 | 64 | 63 | 62 | 61 | 60 |
| | 4 | 59 | 58 | 57 | 56 | 55 | 54 | 53 | 52 | 51 | 50 |
| | 5 | 49 | 48 | 47 | 46 | 45 | 44 | 43 | 42 | 41 | 40 |
| | 6 | 39 | 38 | 37 | 36 | 35 | 34 | 33 | 32 | 31 | 30 |
| | 7 | 29 | 28 | 27 | 26 | 25 | 24 | 23 | 22 | 21 | 20 |
| | 8 | 19 | 18 | 17 | 16 | 15 | 14 | 13 | 12 | 11 | 10 |
| | 9 | 9 | 8 | 7 | 6 | 5 | 4 | 3 | 2 | 1 | 0 |

FIG. 9

| WRITE | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 20 | 21 | 22 | 23 | 24 | 25 | 26 | 27 | 28 | 29 |
| | 3 | 30 | 31 | 32 | 33 | 34 | 35 | 36 | 37 | 38 | 39 |
| | 4 | 40 | 41 | 42 | 43 | 44 | 45 | 46 | 47 | 48 | 49 |
| | 5 | 50 | 51 | 52 | 53 | 54 | 55 | 56 | 57 | 58 | 59 |
| | 6 | 60 | 61 | 62 | 63 | 64 | 65 | 66 | 67 | 68 | 69 |
| | 7 | 70 | 71 | 72 | 73 | 74 | 75 | 76 | 77 | 78 | 79 |
| | 8 | 80 | 81 | 82 | 83 | 84 | 85 | 86 | 87 | 88 | 89 |
| | 9 | 90 | 91 | 92 | 93 | 94 | 95 | 96 | 97 | 98 | 99 |

FIG. 10

| READ | PIXEL NO. | | | | | | | | | |
|---|---|---|---|---|---|---|---|---|---|---|
| | 0 | 1 | 2 | 3 | 4 | 5 | 6 | 7 | 8 | 9 |
| LINE NO. 0 | 0 | 1 | 2 | 3 | 4 | 5 | 6 | 7 | 8 | 9 |
| 1 | 10 | 11 | 12 | 13 | 14 | 15 | 16 | 17 | 18 | 19 |
| 2 | 80 | 81 | 88 | 87 | 86 | 85 | 84 | 83 | 82 | 89 |
| 3 | 70 | 71 | 78 | 77 | 76 | 75 | 74 | 73 | 72 | 79 |
| 4 | 60 | 61 | 68 | 67 | 66 | 65 | 64 | 63 | 62 | 69 |
| 5 | 50 | 51 | 58 | 57 | 56 | 55 | 54 | 53 | 52 | 59 |
| 6 | 40 | 41 | 48 | 47 | 46 | 45 | 44 | 43 | 42 | 49 |
| 7 | 30 | 31 | 38 | 37 | 36 | 35 | 34 | 33 | 32 | 39 |
| 8 | 20 | 21 | 28 | 27 | 26 | 25 | 24 | 23 | 22 | 29 |
| 9 | 90 | 91 | 92 | 93 | 94 | 95 | 96 | 97 | 98 | 99 |

FIG. 15

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 90 | 91 | 92 | 93 | 94 | 95 | 96 | 97 | 98 | 99 |
| | 1 | 80 | 81 | 82 | 83 | 84 | 85 | 86 | 87 | 88 | 89 |
| | 2 | 70 | 71 | 72 | 73 | 74 | 75 | 76 | 77 | 78 | 79 |
| | 3 | 60 | 61 | 62 | 63 | 64 | 65 | 66 | 67 | 68 | 69 |
| | 4 | 50 | 51 | 52 | 53 | 54 | 55 | 56 | 57 | 58 | 59 |
| | 5 | 40 | 41 | 42 | 43 | 44 | 45 | 46 | 47 | 48 | 49 |
| | 6 | 30 | 31 | 32 | 33 | 34 | 35 | 36 | 37 | 38 | 39 |
| | 7 | 20 | 21 | 22 | 23 | 24 | 25 | 26 | 27 | 28 | 29 |
| | 8 | 10 | 11 | 12 | 13 | 14 | 15 | 16 | 17 | 18 | 19 |
| | 9 | 0 | 1 | 2 | 3 | 4 | 5 | 6 | 7 | 8 | 9 |

FIG. 16

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 80 | 81 | 82 | 83 | 84 | 85 | 86 | 87 | 88 | 89 |
| | 3 | 70 | 71 | 72 | 73 | 74 | 75 | 76 | 77 | 78 | 79 |
| | 4 | 60 | 61 | 62 | 63 | 64 | 65 | 66 | 67 | 68 | 69 |
| | 5 | 50 | 51 | 52 | 53 | 54 | 55 | 56 | 57 | 58 | 59 |
| | 6 | 40 | 41 | 42 | 43 | 54 | 45 | 46 | 47 | 48 | 49 |
| | 7 | 30 | 31 | 32 | 33 | 34 | 35 | 36 | 37 | 38 | 39 |
| | 8 | 20 | 21 | 22 | 23 | 24 | 25 | 26 | 27 | 28 | 29 |
| | 9 | 90 | 91 | 92 | 93 | 94 | 95 | 96 | 97 | 98 | 99 |

FIG. 19

| WRITE | PIXEL NO. | | | | | | | | | |
|---|---|---|---|---|---|---|---|---|---|---|
| | 0 | 1 | 2 | 3 | 4 | 5 | 6 | 7 | 8 | 9 |
| LINE NO. 0 | 0 | 1 | 2 | 3 | 4 | 5 | 6 | 7 | 8 | 9 |
| 1 | 10 | 11 | 12 | 13 | 14 | 15 | 16 | 17 | 18 | 19 |
| 2 | 20 | 21 | 22 | 23 | 24 | 25 | 26 | 27 | 28 | 29 |
| 3 | 30 | 31 | 32 | 33 | 34 | 35 | 36 | 37 | 38 | 39 |
| 4 | 40 | 41 | 42 | 43 | 44 | 45 | 46 | 47 | 48 | 49 |
| 5 | 50 | 51 | 52 | 53 | 54 | 55 | 56 | 57 | 58 | 59 |
| 6 | 60 | 61 | 62 | 63 | 64 | 65 | 66 | 67 | 68 | 69 |
| 7 | 70 | 71 | 72 | 73 | 74 | 75 | 76 | 77 | 78 | 79 |
| 8 | 80 | 81 | 82 | 83 | 84 | 85 | 86 | 87 | 88 | 89 |
| 9 | 90 | 91 | 92 | 93 | 94 | 95 | 96 | 97 | 98 | 99 |

FIG. 20

| READ | PIXEL NO. | | | | | | | | | |
|---|---|---|---|---|---|---|---|---|---|---|
| | 0 | 1 | 2 | 3 | 4 | 5 | 6 | 7 | 8 | 9 |
| LINE NO. 0 | 20 | 21 | 22 | 23 | 24 | 25 | 26 | 27 | 28 | 29 |
| 1 | | | | | | | | | | |
| 2 | 30 | 31 | 32 | 33 | 34 | 35 | 36 | 37 | 38 | 39 |
| 3 | | | | | | | | | | |
| 4 | 40 | 41 | 42 | 43 | 44 | 45 | 46 | 47 | 48 | 49 |
| 5 | | | | | | | | | | |
| 6 | 50 | 51 | 52 | 53 | 54 | 55 | 56 | 57 | 58 | 59 |
| 7 | | | | | | | | | | |
| 8 | 60 | 61 | 62 | 63 | 64 | 65 | 66 | 67 | 68 | 69 |
| 9 | | | | | | | | | | |

FIG. 21

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 20 | 21 | 22 | 23 | 24 | 25 | 26 | 27 | 28 | 29 |
| | 1 | · | · | · | · | · | · | · | · | · | · |
| | 2 | 30 | 31 | 32 | 33 | 34 | 35 | 36 | 37 | 38 | 39 |
| | 3 | · | · | · | · | · | · | · | · | · | · |
| | 4 | 40 | 41 | 42 | 43 | 44 | 45 | 46 | 47 | 48 | 49 |
| | 5 | · | · | · | · | · | · | · | · | · | · |
| | 6 | 50 | 51 | 52 | 53 | 54 | 55 | 56 | 57 | 58 | 59 |
| | 7 | · | · | · | · | · | · | · | · | · | · |
| | 8 | 60 | 61 | 62 | 63 | 64 | 65 | 66 | 67 | 68 | 69 |
| | 9 | | | | | | | | | | |

FIG. 22

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 23 | · | 24 | · | 25 | · | 26 | · | 27 | |
| | 1 | · | · | · | · | · | · | · | · | · | |
| | 2 | 33 | · | 34 | · | 35 | · | 36 | · | 37 | |
| | 3 | · | · | · | · | · | · | · | · | · | |
| | 4 | 43 | · | 44 | · | 45 | · | 46 | · | 47 | |
| | 5 | · | · | · | · | · | · | · | · | · | |
| | 6 | 53 | · | 54 | · | 55 | · | 56 | · | 57 | |
| | 7 | · | · | · | · | · | · | · | · | · | |
| | 8 | 63 | · | 64 | · | 65 | · | 66 | · | 67 | |
| | 9 | | | | | | | | | | |

FIG. 23

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 60 | 61 | 62 | 63 | 64 | 65 | 66 | 67 | 68 | 69 |
| | 1 | | | | | | | | | | |
| | 2 | 50 | 51 | 52 | 53 | 54 | 55 | 56 | 57 | 58 | 59 |
| | 3 | | | | | | | | | | |
| | 4 | 40 | 41 | 42 | 43 | 44 | 45 | 46 | 47 | 48 | 49 |
| | 5 | | | | | | | | | | |
| | 6 | 30 | 31 | 32 | 33 | 34 | 35 | 36 | 37 | 38 | 39 |
| | 7 | | | | | | | | | | |
| | 8 | 20 | 21 | 22 | 23 | 24 | 25 | 26 | 27 | 28 | 29 |
| | 9 | | | | | | | | | | |

FIG. 24

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 60 | 61 | 62 | 63 | 64 | 65 | 66 | 67 | 68 | 69 |
| | 1 | · | · | · | · | · | · | · | · | · | · |
| | 2 | 50 | 51 | 52 | 53 | 54 | 55 | 56 | 57 | 58 | 59 |
| | 3 | · | · | · | · | · | · | · | · | · | · |
| | 4 | 40 | 41 | 42 | 43 | 44 | 45 | 46 | 47 | 48 | 49 |
| | 5 | · | · | · | · | · | · | · | · | · | · |
| | 6 | 30 | 31 | 32 | 33 | 34 | 35 | 36 | 37 | 38 | 39 |
| | 7 | · | · | · | · | · | · | · | · | · | · |
| | 8 | 20 | 21 | 22 | 23 | 24 | 25 | 26 | 27 | 28 | 29 |
| | 9 | | | | | | | | | | |

FIG. 25

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 69 | 68 | 67 | 66 | 65 | 64 | 63 | 62 | 61 | 60 |
| | 1 | • | • | • | • | • | • | • | • | • | • |
| | 2 | 59 | 58 | 57 | 56 | 55 | 54 | 53 | 52 | 51 | 50 |
| | 3 | • | • | • | • | • | • | • | • | • | • |
| | 4 | 49 | 48 | 47 | 46 | 45 | 44 | 43 | 42 | 41 | 40 |
| | 5 | • | • | • | • | • | • | • | • | • | • |
| | 6 | 39 | 38 | 37 | 36 | 35 | 34 | 33 | 32 | 31 | 30 |
| | 7 | • | • | • | • | • | • | • | • | • | • |
| | 8 | 29 | 28 | 27 | 26 | 25 | 24 | 23 | 22 | 21 | 20 |
| | 9 | | | | | | | | | | |

FIG. 26

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 67 | • | 66 | • | 65 | • | 64 | • | 63 | |
| | 1 | • | • | • | • | • | • | • | • | • | |
| | 2 | 57 | • | 56 | • | 55 | • | 54 | • | 53 | |
| | 3 | • | • | • | • | • | • | • | • | • | |
| | 4 | 47 | • | 46 | • | 45 | • | 44 | • | 43 | |
| | 5 | • | • | • | • | • | • | • | • | • | |
| | 6 | 37 | • | 36 | • | 35 | • | 34 | • | 33 | |
| | 7 | • | • | • | • | • | • | • | • | • | |
| | 8 | 27 | • | 26 | • | 25 | • | 24 | • | 23 | |
| | 9 | | | | | | | | | | |

FIG. 27

| WRITE | PIXEL NO. | | | | | | | | | |
|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 20 | 21 | 22 | 23 | 24 | 25 | 26 | 27 | 28 | 29 |
| | 3 | 30 | 31 | 32 | 33 | 34 | 35 | 36 | 37 | 38 | 39 |
| | 4 | 40 | 41 | 42 | 43 | 44 | 45 | 46 | 47 | 48 | 49 |
| | 5 | 50 | 51 | 52 | 53 | 54 | 55 | 56 | 57 | 58 | 59 |
| | 6 | 60 | 61 | 62 | 63 | 64 | 65 | 66 | 67 | 68 | 69 |
| | 7 | 70 | 71 | 72 | 73 | 74 | 75 | 76 | 77 | 78 | 79 |
| | 8 | 80 | 81 | 82 | 83 | 84 | 85 | 86 | 87 | 88 | 89 |
| | 9 | 90 | 91 | 92 | 93 | 94 | 95 | 96 | 97 | 98 | 99 |

FIG. 28

| READ | PIXEL NO. | | | | | | | | | |
|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 30 | 31 | 32 | 33 | 34 | 35 | 36 | 37 | 38 | 39 |
| | 3 | | | | | | | | | | |
| | 4 | 40 | 41 | 42 | 43 | 44 | 45 | 46 | 47 | 48 | 49 |
| | 5 | | | | | | | | | | |
| | 6 | 50 | 51 | 52 | 53 | 54 | 55 | 56 | 57 | 58 | 59 |
| | 7 | | | | | | | | | | |
| | 8 | 60 | 61 | 62 | 63 | 64 | 65 | 66 | 67 | 68 | 69 |
| | 9 | 90 | 91 | 92 | 93 | 94 | 95 | 96 | 97 | 98 | 99 |

FIG. 29

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 30 | 31 | 32 | 33 | 34 | 35 | 36 | 37 | 38 | 39 |
| | 3 | • | • | • | • | • | • | • | • | • | • |
| | 4 | 40 | 41 | 42 | 43 | 44 | 45 | 46 | 47 | 48 | 49 |
| | 5 | • | • | • | • | • | • | • | • | • | • |
| | 6 | 50 | 51 | 52 | 53 | 54 | 55 | 56 | 57 | 58 | 59 |
| | 7 | • | • | • | • | • | • | • | • | • | • |
| | 8 | 60 | 61 | 62 | 63 | 64 | 65 | 66 | 67 | 68 | 69 |
| | 9 | 90 | 91 | 92 | 93 | 94 | 95 | 96 | 97 | 98 | 99 |

FIG. 30

| READ | PIXEL NO. | | | | | | | | | |
|---|---|---|---|---|---|---|---|---|---|---|
| LINE NO. | | 0 | 1 | 2 | 3 | 4 | 5 | 6 | 7 | 8 | 9 |
| | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 30 | 31 | 33 | • | 34 | • | 35 | • | 36 | 39 |
| | 3 | • | • | • | • | • | • | • | • | • | • |
| | 4 | 40 | 41 | 43 | • | 44 | • | 45 | • | 46 | 49 |
| | 5 | • | • | • | • | • | • | • | • | • | • |
| | 6 | 50 | 51 | 53 | • | 54 | • | 55 | • | 56 | 59 |
| | 7 | • | • | • | • | • | • | • | • | • | • |
| | 8 | 60 | 61 | 63 | • | 64 | • | 65 | • | 66 | 69 |
| | 9 | 90 | 91 | 92 | 93 | 94 | 95 | 96 | 97 | 98 | 99 |

FIG. 31

| READ | PIXEL NO. | | | | | | | | | |
|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 60 | 61 | 62 | 63 | 64 | 65 | 66 | 67 | 68 | 69 |
| | 3 | | | | | | | | | | |
| | 4 | 50 | 51 | 52 | 53 | 54 | 55 | 56 | 57 | 58 | 59 |
| | 5 | | | | | | | | | | |
| | 6 | 40 | 41 | 42 | 43 | 44 | 45 | 46 | 47 | 48 | 49 |
| | 7 | | | | | | | | | | |
| | 8 | 30 | 31 | 32 | 33 | 34 | 35 | 36 | 37 | 38 | 39 |
| | 9 | 90 | 91 | 92 | 93 | 94 | 95 | 96 | 97 | 98 | 99 |

FIG. 32

| READ | PIXEL NO. | | | | | | | | | |
|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 60 | 61 | 62 | 63 | 64 | 65 | 66 | 67 | 68 | 69 |
| | 3 | · | · | · | · | · | · | · | · | · | · |
| | 4 | 50 | 51 | 52 | 53 | 54 | 55 | 56 | 57 | 58 | 59 |
| | 5 | · | · | · | · | · | · | · | · | · | · |
| | 6 | 40 | 41 | 42 | 43 | 44 | 45 | 46 | 47 | 48 | 49 |
| | 7 | · | · | · | · | · | · | · | · | · | · |
| | 8 | 30 | 31 | 32 | 33 | 34 | 35 | 36 | 37 | 38 | 39 |
| | 9 | 90 | 91 | 92 | 93 | 94 | 95 | 96 | 97 | 98 | 99 |

FIG. 33

| READ | | PIXEL NO. | | | | | | | | | |
|---|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 60 | 61 | 68 | 67 | 66 | 65 | 64 | 63 | 62 | 69 |
| | 3 | • | • | • | • | • | • | • | • | • | • |
| | 4 | 50 | 51 | 58 | 57 | 56 | 55 | 54 | 53 | 52 | 59 |
| | 5 | • | • | • | • | • | • | • | • | • | • |
| | 6 | 40 | 41 | 48 | 47 | 46 | 45 | 44 | 43 | 42 | 49 |
| | 7 | • | • | • | • | • | • | • | • | • | • |
| | 8 | 30 | 31 | 38 | 37 | 36 | 35 | 34 | 33 | 32 | 39 |
| | 9 | 90 | 91 | 92 | 93 | 94 | 95 | 96 | 97 | 98 | 99 |

FIG. 34

| READ | | PIXEL NO. | | | | | | | | | |
|---|---|---|---|---|---|---|---|---|---|---|---|
| | | 0 | 1 | 2 | 3 | 4 | 5 | 6 | 7 | 8 | 9 |
| LINE NO. | 0 | 0 | 1 | 2 | 3 | 4 | 5 | 6 | 7 | 8 | 9 |
| | 1 | 10 | 11 | 12 | 13 | 14 | 15 | 16 | 17 | 18 | 19 |
| | 2 | 60 | 61 | 66 | • | 65 | • | 64 | • | 63 | 69 |
| | 3 | • | • | • | • | • | • | • | • | • | • |
| | 4 | 50 | 51 | 56 | • | 55 | • | 54 | • | 53 | 59 |
| | 5 | • | • | • | • | • | • | • | • | • | • |
| | 6 | 40 | 41 | 46 | • | 45 | • | 44 | • | 43 | 49 |
| | 7 | • | • | • | • | • | • | • | • | • | • |
| | 8 | 30 | 31 | 36 | • | 35 | • | 34 | • | 33 | 39 |
| | 9 | 90 | 91 | 92 | 93 | 94 | 95 | 96 | 97 | 98 | 99 | though the vertical-down orientation. FIG. 1 shows a
IMAGING APPARATUS AND METHOD WITH UPSIDE-DOWN MODE AND NORMAL MODE TRANSITIONING

BACKGROUND OF THE INVENTION

The present invention relates to an imaging apparatus that operates in both a right-side-up orientation and an upside-down orientation.

One imaging apparatus of this type is a ceiling-mounted video surveillance camera that swivels vertically back and forth to monitor an area extending in front of and behind the camera location. As the camera swivels from looking horizontally forward to looking diagonally forward, then vertically down, the picture displayed on the monitor screen changes from a right-side-up horizontal view to an oblique view, then a plan view. As the camera continues to swivel from looking vertically down to looking diagonally backward, then horizontally backward, if no corrective action is taken, the displayed picture appears first obliquely upside down, then completely upside down.

A conventional method of avoiding an upside-down picture is to rotate the camera one hundred eighty degrees (180°) about its optic axis each time the camera passes through the vertical-down orientation. FIG. 1 shows a simple block diagram of a conventional imaging apparatus, comprising a control unit 210, a video camera 300, a rotating mount 310, and a swiveling mount 320, in which this method is adopted. The control unit 210 controls the rotating mount 310, which rotates the video camera 300 about its optic axis. The control unit 210 also controls the swiveling mount 320, which swivels the video camera 300 and rotating mount 310 about an axis perpendicular to the optic axis of the video camera 300.

A problem is that when the camera is physically rotated about its optic axis, to a person watching the picture on the monitor screen, the scene being viewed appears to rotate in a dizzying manner. A further problem is that the rotating mount 310 is bulky and expensive.

SUMMARY OF THE INVENTION

An object of the present invention is to right an upside-down image produced by an imaging apparatus, without physically rotating the apparatus.

Another object of the invention is to combine the image-righting function with other image-processing functions, such as noise reduction, slow shutter, frame save/recall, and zoom.

The invented image-processing method comprises the steps of storing a source image produced by an imaging device in a memory circuit, and reading the source image from the memory circuit to generate an output image. The source image data-are read from the memory circuit in one order if the source image is right-side up, and in a vertically reverse order, or a vertically and horizontally reverse order, if the source image is upside down. The output image is therefore always right-side up.

The image-righting function is combined with image-processing functions such as noise reduction and slow shutter by reading the source image from the memory circuit again to generate an internal image, which is always read as if the source image were right-side-up order. The image-righting function is combined with the save/recall function by leaving the source image stored in the memory circuit for later recall. The image-righting function is combined with the zoom function by omitting parts of the source image when the source image is read from the memory circuit.

The invention also provides an image-processing apparatus that operates in different orientations and employs the invented image-processing method to right upside-down images.

BRIEF DESCRIPTION OF THE DRAWINGS

In the attached drawings:

FIG. 4 illustrates a source image field;

FIG. 5 shows an example of the internal organization of the memory circuit in FIG. 3;

FIG. 6 illustrates a source image field stored in one memory area in FIG. 5;

FIG. 7 illustrates the reading of a right-side-up source image field from another memory area in FIG. 5;

FIG. 8 illustrates the reading of an upside-down source image field;

FIG. 9 illustrates a source image field including blanking intervals;

FIG. 10 illustrates the reading of an upside-down source image field including blanking intervals;

FIG. 15 illustrates the reading of an upside-down source image field in the fourth embodiment;

FIG. 16 illustrates the reading of an upside-down source image field including blanking intervals in the fourth embodiment;

FIG. 19 illustrates a source image field with a zoom area;

FIG. 20 illustrates the reading of the source image field in FIG. 19 when right-side up;

FIG. 21 illustrates vertical interpolation of the image read in FIG. 20;

FIG. 22 illustrates horizontal expansion and interpolation of the image in FIG. 21;

FIG. 23 illustrates the reading of the source image field in FIG. 19 when upside-down;

FIG. 24 illustrates vertical interpolation of the image read in FIG. 23;

FIG. 25 illustrates horizontal reversal of the image in FIG. 24;

FIG. 26 illustrates horizontal expansion and interpolation of the image in FIG. 25;

FIG. 27 illustrates a source image field with a zoom area and blanking intervals;

FIG. 28 illustrates the reading of the source image field in FIG. 27 when right-side up;

FIG. 29 illustrates vertical interpolation of the image read in FIG. 28;

FIG. 30. illustrates horizontal expansion and interpolation of the image in FIG. 29;

FIG. 31 illustrates the reading of the source image field in FIG. 27 when upside-down;

FIG. 32 illustrates vertical interpolation of the image read in FIG. 31;

FIG. 33 illustrates horizontal reversal of the image in FIG. 32; and

FIG. 34 illustrates horizontal expansion and interpolation of the image in FIG. 33.

DETAILED DESCRIPTION OF THE INVENTION

Figure 1:
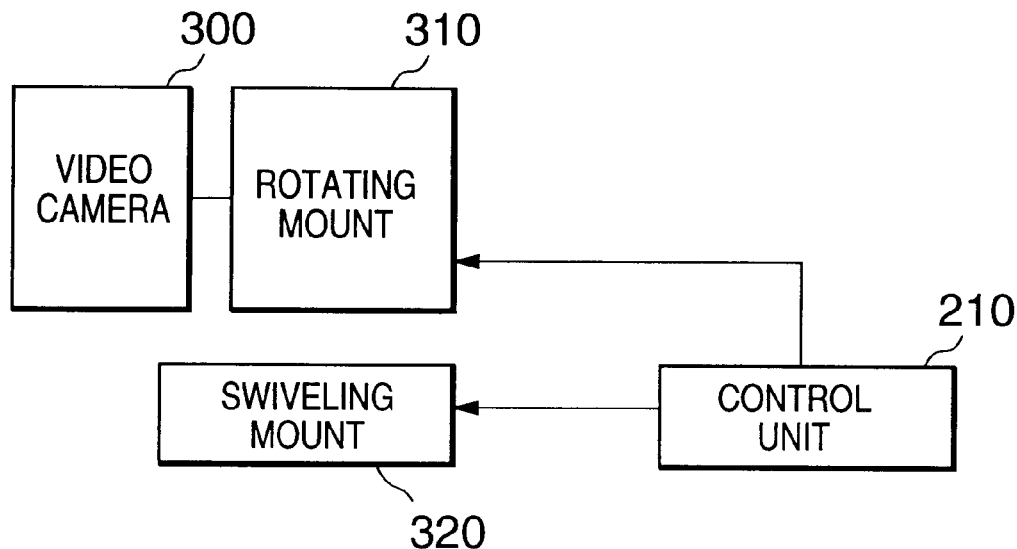
FIG. 1 is a block diagram of a conventional imaging apparatus.

Embodiments of the invention will be described with reference to the attached drawings, in which like parts are indicated by like reference characters.

Figure 2:
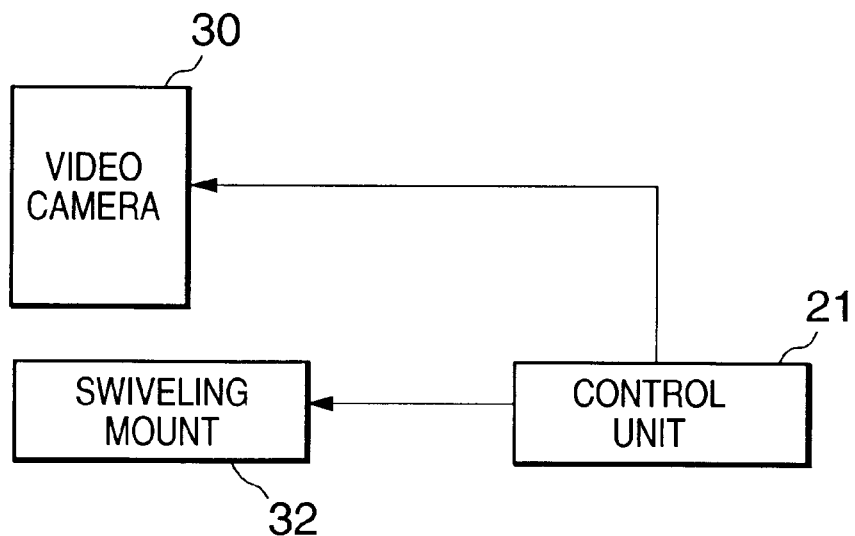
FIG. 2 is a general block diagram illustrating several embodiments of the invented imaging apparatus.

Referring to FIG. 2, a first embodiment comprises a control unit 21, a video camera 30, and a swiveling mount 32. The swiveling mount 32 is attached to the ceiling of a large room, near the center of the room, for example, and swivels the video camera 30 on a horizontal axis, perpendicular to the optic axis of the video camera 30, so that the video camera 30 can look both forward and backward to monitor the entire room. The control unit 21 controls the video camera 30 and swiveling mount 32. The control unit 21 is shown as external to the video camera 30 for clarity, but when the invention is practiced, the control unit 21 may be incorporated into the video camera 30, an arrangement that is preferable for compactness.

Figure 3:
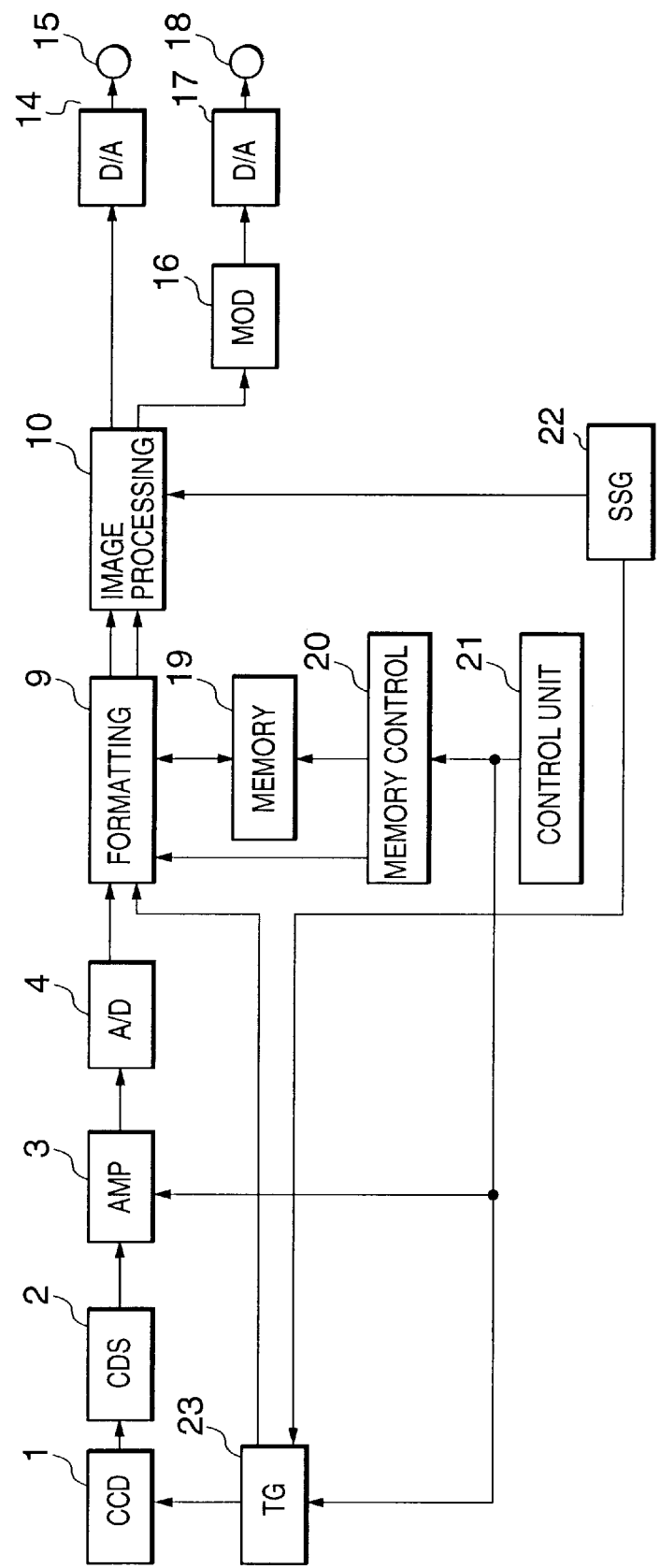
FIG. 3 is a more detailed block diagram of the video camera in FIG. 2, illustrating a first embodiment.

The video camera 30 has the internal structure shown in FIG. 3, comprising an imaging device 1 such as a charge-coupled device (CCD) that outputs an electronic image signal or source image signal, a correlated double sampling (CDS) circuit 2 that removes noise from the source image signal, a variable-gain amplifier (AMP) 3 that amplifies the resulting image signal, an analog-to-digital converter (A/D) that converts the amplified image signal to a digital signal, a formatting circuit 9 that formats the digital signal and a vertical color identification signal to obtain video data for storage in a memory circuit 19, and deformats data read from the memory circuit 19 to recover the original digital video signal and vertical color identification signal, an image-processing circuit 10 that performs processing necessary to produce an output luminance signal and color-difference signal meeting certain video standards, a first digital-to-analog converter (D/A) 14 that converts the digital luminance signal to an analog luminance signal, a luminance signal output terminal 15, a modulating circuit (MOD) 16 that modulates the color-difference signal onto a color subcarrier signal, a second digital-to-analog converter 17 that converts the modulated color subcarrier signal to an analog chrominance signal, a chrominance signal output terminal 18, the above-mentioned memory circuit 19, a memory control circuit 20 that controls the reading and writing of data in the memory circuit 19, a synchronizing signal generator (SSG) 22 that generates horizontal and vertical synchronizing signals, and a timing generator (TG) 23 that generates the vertical color identification signal and other timing signals from the synchronizing signals. The control unit 21 controls the amplifier 3, memory control circuit 20, and timing generator 23. The control unit 21 comprises a microelectronic computing device such as a microprocessor or microcontroller.

The components shown in FIG. 3 operate as follows.

The imaging device 1 responds to a timing signal from the timing generator 23 by integrating light from the scene being imaged for a predetermined time to acquire an image, then providing output of an analog image signal while integrating the next image. The imaging device 1 has a color filter array, and produces an image signal with separate red (R), green (G), and blue (B) information, mixed with noise. The correlated double sampling circuit 2 samples the image signal, including the noise component, to obtain a first signal level, samples the noise component by itself to obtain a second signal level, and subtracts the second signal level from the first signal level to remove as much of the noise component as possible. The amplifier 3 amplifies the image signal output by the correlated double sampling circuit 2, with a gain set by the control unit 21.

After digitization by the analog-to-digital converter 4, the image signal is combined with the vertical color identification signal in the formatting circuit 9, which formats these two signals to fit the data width or word width of the memory circuit 19. For example, if the analog-to-digital converter 4 converts each picture element or pixel to a ten-bit value, and the word width of the formatting circuit 9 is sixteen bits, the memory circuit 19 may combine fifteen image-signal bits, representing 1.5 pixels, with one vertical color identification signal bit to form a sixteen-bit word for transfer to the memory circuit 19. In this case, the data for three pixels are stored in two words.

Ten-bit pixel values and a sixteen-bit data word width are mentioned here only as examples. The analog-to-digital converter 4 may convert each pixel to eight bits or any other number of bits, and the word width of the memory circuit 19 may be sixteen, thirty-two, or any other number of bits.

The memory control circuit 20 controls the formatting circuit 9 and memory circuit 19 so that the formatted words are written into the memory circuit 19 as they are generated by the formatting circuit 9. Later, the formatting circuit 9 reads the data back from the memory circuit 19, recovers the image signal and vertical color identification signal, and supplies them as an output image signal to the image-processing circuit 10. In the example above, the formatting circuit 9 reads sixteen-bit words from the memory circuit 19, but supplies the image-processing circuit 10 with a ten-bit image signal and a one-bit vertical color identification signal.

The image-processing circuit 10, operating in response to the synchronizing signals generated by the synchronizing signal generator 22, processes the output image signal to obtain a luminance signal (Y) and a line-sequential color-difference signal. The line-sequential color-difference signal represents the R-Y difference and B-Y difference in alternate lines. The vertical color identification signal indicates which color-difference information should be generated in each line. The image-processing circuit 10 aligns the R-Y and B-Y signals on the time axis, adds synchronizing signals to the luminance and color-difference signals, and performs contour correction, white balance adjustment, gamma correction, encoding, and other necessary processes, at timings determined by the synchronizing signals.

After conversion by the first digital-to-analog converter 14, the luminance signal is output from the luminance signal output terminal 15. The modulating circuit 16 uses the color-difference signal to modulate a color subcarrier signal, which is then converted to an analog signal by the first digital-to-analog converter 17 and output from the chrominance signal output terminal 18.

The memory circuit 19 has a capacity for storing a certain number of fields. Data are transferred between the memory circuit 19 and formatting circuit 9 on a field-by-field basis.

The memory control circuit 20 operates according to a predetermined read-write schedule. At certain timings, it sends the memory circuit 19 a read or write command signal and address signals indicating a memory address. Read and write command signals are also sent to the formatting circuit 9 at these timings, causing the formatting circuit 9 to output data to be written in the memory circuit 19, or input data read from the memory circuit 19.

In writing a field of data, the formatting circuit 9 sends the data to the memory circuit 19 in the same order as received from the analog-to-digital converter 4, in synchronization with the command signals received from the memory control circuit 20. The memory circuit 19 receives the data, one word at a time, at its data input-output terminals (not visible), and stores each received word at the memory address specified by the memory control circuit 20.

When a field is read, the memory circuit 19 outputs data one word at a time on its data input-output terminals, from the memory addresses specified by the memory control circuit 20. The formatting circuit 9 receives the data at its own data-input-output terminals, sampling the received data in synchronization with command signals furnished by the memory control circuit 20, at a rate based on the sampling rate of the analog-to-digital converter 4.

The control unit 21 controls the memory control circuit 20 by specifying a normal mode and an upside-down mode of operation. In the normal mode, for each field, the memory control circuit 20 generates read addresses identical to the write addresses it generated one frame (two fields) before. The read addresses are generated in the same order as the write addresses. In the upside-down mode, the memory control circuit 20 generates the same read addresses for each field, but in reverse order to the write addresses generated for the same field one frame before.

The operations in these modes will be illustrated below for an exemplary case in which each field of the source image stored in the memory circuit 19 comprises ten lines of ten pixels each. The lines, and the pixels in each line, are numbered from zero to nine as shown in FIG. 4. The pixels in the entire field are numbered from zero to ninety-nine, these numbers indicating the order in which the pixel data are written into the memory circuit 19.

In practice, there will normally be more than ten lines per field and more than ten pixels per line, but the principle remains the same.

In this example, the memory circuit 19 stores data for four hundred pixels at row addresses from zero to thirty-nine and column addresses from zero to nine, as shown in FIG. 5. The formatting circuit 9 stores two frames or four fields, each field comprising data for one hundred pixels, stored at ten consecutive row addresses. The numbers from zero to three hundred ninety-nine in FIG. 5 indicate the order in which write addresses are generated for four consecutive fields. After the last (399th) pixel in the four fields has been written at row address thirty-nine and column address nine, the first pixel in the next field is written as pixel zero at row address zero and column address zero.

In FIG. 5, read access to the first field (comprising pixels 0–99) takes place during the same time interval as write access to the third field (comprising pixels 200–299). In the normal mode of operation, during this interval, the memory control circuit 20 generates write addresses in the order shown in FIG. 6, and read addresses in the order shown in FIG. 7. In the upside-down mode, during this interval, the memory control circuit 20 generates write addresses in the order shown in FIG. 6, and generates read addresses in the order shown in FIG. 8, so that the memory circuit 19 receives the pixel data for this field in reverse order.

The foregoing description assumes that only pixels in the visible picture area, referred to as the effective picture area, are stored in the memory circuit 19. In a variation of this operation, the memory circuit 19 also stores source-image data for the horizontal and vertical blanking intervals, the data stored during these intervals corresponding to optical black. In FIG. 9, for example, the data written in rows and columns zero, one, and nine correspond to the blanking intervals; the effective picture area is the area enclosed by the dashed line, extending from column two to column eight in rows two to eight. In the normal mode, the memory control circuit 20 again generates read addresses in the order shown in FIG. 6. In the upside-down mode, however, the memory control circuit 20 now generates read addresses in the order shown in FIG. 10, reversing the pixel sequence in the effective picture area but leaving the pixel sequence unchanged in the blanking intervals.

As can be seen from FIGS. 8 and 10, in the upside-down mode, the visible picture is rotated through 180°. When the video camera 30 is looking forward, the control unit 21 commands the memory control circuit 20 to operate in the normal mode, and the picture displayed on the monitor screen (not visible) appears right-side up. When the video camera 30 is looking backward, the control unit 21 commands the memory control circuit 20 to operate in the upside-down mode. The resulting 180° rotation of the picture compensates for the upside-down orientation of the camera, so that the displayed picture again appears right-side up. The transition between the normal mode and upside-down mode takes place when the video camera 30 is looking directly downward.

As the swiveling mount 32 swivels from front to back, a person watching the output image on the monitor screen sees a right-side-up forward-looking view that gradually changes to a downward-looking plan view. When the downward-looking view is exactly vertical, the picture abruptly flips over. Since this abrupt change of view takes place substantially instantaneously, it is not dizzying; it is similar to a scene change. As the swiveling mount 32 continues to swivel, the person sees the downward-looking view gradually become a right-side-up backward-looking view.

As the swiveling mount 32 swivels from back to front, the same process takes place in reverse, the picture flipping over at the instant when the video camera 30 is looking straight down and a plan view is displayed. The picture never appears upside-down.

Compared with the prior art, the first embodiment is more compact and less expensive, because it does not require a rotating mount for rotating the video camera 30 about its optic axis.

The first embodiment also eliminates the dizzying effect produced by physical rotation of the video camera 30.

The first embodiment requires a formatting circuit 9, memory circuit 19, and memory control circuit 20 that are not required in the prior art, but these additional components, comprising a small number of semiconductor integrated circuits, do not greatly increase the size or cost of the video camera 30. The first embodiment also minimizes the size and cost of the memory circuit 19 by having it store the image signal before the image signal is separated into a luminance signal and a color-difference signal by the image-processing circuit 10, so that only one signal-has to be stored instead of two.

Next, a second embodiment will be described.

Figure 11:
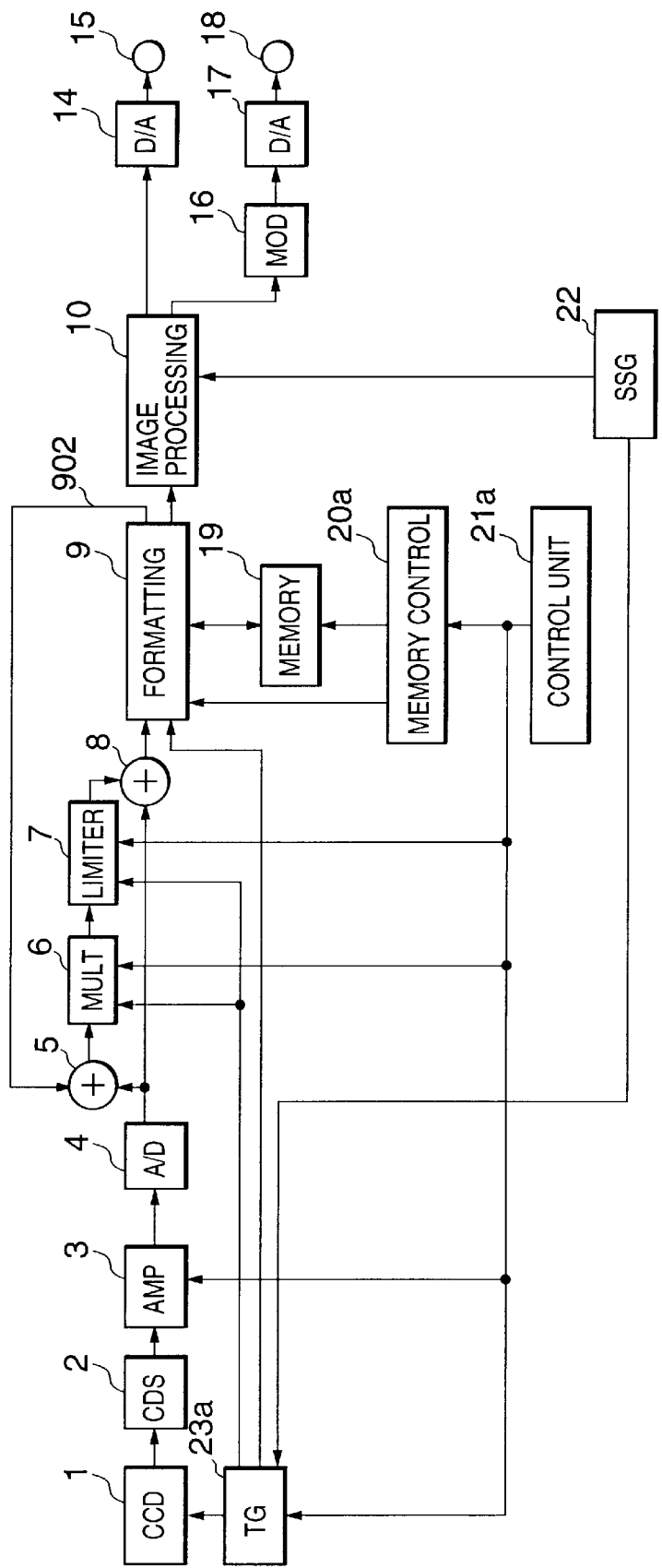
FIG. 11 is a more detailed block diagram of the video camera in FIG. 2, illustrating a second embodiment.

Referring to FIG. 11, the second embodiment is similar to the first embodiment, with the addition of a first subtractor 5, a multiplier (MULT) 6, a limiter 7, and a second subtractor 8, and with modifications to the formatting circuit 9a, memory control circuit 20a, control unit 21a, and timing generator 23a.

The formatting circuit 9a now generates a first image signal or output image signal 901, which is sent to the image-processing circuit 10, and a second image signal or internal image signal 902, which is sent to the first subtractor 5. The first subtractor 5 subtracts the internal image signal 902 from the source image signal output by the analog-to-digital converter 4. The multiplier 6 multiplies the resulting difference signal by a factor supplied by the control unit 21a. The limiter 7 limits the resulting signal to a certain maximum value, also supplied by the control unit 21a. The operation of the multiplier 6 and limiter 7 is synchronized with signals supplied from the timing generator 23a. The second subtractor 8 subtracts the limited signal output by the limiter 7 from the source image signal output by the analog-to-digital converter 4, and supplies the resulting difference signal to the formatting circuit 9a. The formatting circuit 9a receives this difference signal in place of the output of the analog-to-digital converter 4.

Incidentally, the subtractors 5 and 8 are shown with plus-signs in the drawing because they add one input signal to the two's complement of the other input signal.

The memory control circuit 20a controls the formatting circuit 9a and memory circuit 19 according to a schedule in which each field is written once and read twice. The first read access provides data for the output image signal 901; this read access-is performed in the normal mode or upside-down mode at the direction of the control unit 21a, as in the first embodiment. The second read access provides data for the internal image signal 902; this access is always performed in the normal mode, the data being read in the same order as written. Both the first and second read accesses are performed one frame after the corresponding write access.

The control unit 21a uses the first subtractor 5, multiplier 6, limiter 7, and second subtractor 8 to reduce noise by setting a factor between zero and one in the multiplier 6, and setting an appropriate limiting level in the limiter 7. The difference signal output by the first subtractor 5, being the difference between the signal currently output by the analog-to-digital converter 4 and the signal output by the analog-to-digital converter 4 one frame ago, has a motion component and a noise component. If there is no motion in the image, only the noise component is present. Subtraction of this difference signal from the output of the analog-to-digital converter 4, after multiplication by the factor set in the multiplier 6, has the effect of reducing the noise level in the signal supplied to the formatting circuit 9a. When motion is present, the motion component is also reduced, but the limiting operation performed in the limiter 7 limits the amount of motion reduction. The overall effect is that a cleaner source image is stored in the memory circuit 19, though with some distortion of moving objects. This cleaner source image is read as the output image signal 901 and processed to produce the picture displayed on the monitor screen.

The control unit 21a selects the normal mode and upside-down mode as described in the first embodiment, so the output image signal 901 yields a displayed picture that is always right-side up, even when the video camera is looking backward.

By having the formatting circuit 9a generate two output signals, the second embodiment enables the noise-reduction and the image-righting functions to be carried out concurrently, even at the point of switchover from the normal mode to the upside-down mode.

In other respects, the second embodiment operates in the same way as the first embodiment.

In a variation of the second embodiment, the control unit 21a also uses the first subtractor 5, multiplier 6, limiter 7, second subtractor 8, and timing generator 23a to implement a slow-shutter function, by extending the exposure time per field. In this variation, the timing generator 23a controls the imaging device 1 to provide an exposure time of, for example, $\frac{1}{30}$ of a second per field, while maintaining the conventional signal output rate of $\frac{1}{60}$ of a second per field. The output of the imaging device 1, and the output of the analog-to-digital converter 4, are accordingly intermittent image signals that are valid for only $\frac{1}{60}$ of a second during each $\frac{1}{30}$-second frame interval. Only one field is output per frame.

During the $\frac{1}{60}$-second intervals in which the output of the analog-to-digital converter 4 is valid, the control unit 21a sets the multiplier 6 and limiter 7 as described above. The formatting circuit 9a receives a signal with reduced noise and motion components.

During the $\frac{1}{60}$-second intervals in which the output of the analog-to-digital converter 4 is invalid, the control unit 21a sets a factor of unity (1.0) in the multiplier 6, and disables the limiter 7 by setting a substantially infinite limiting level. The difference signal output by the first subtractor 5 passes unchanged through the multiplier 6 and limiter 7. The difference signal output by the second subtractor 8 is equal to the internal image signal 902, the invalid output of the analog-to-digital converter 4 being eliminated completely. The formatting circuit 9a receives the same digital signal as it received during the valid $\frac{1}{60}$-second interval in the preceding $\frac{1}{30}$-second frame interval.

In this slow-shutter variation, each field is stored in the formatting circuit 9 twice, so the effective field rate is reduced by half, but the exposure time of each field is doubled, a useful feature for surveillance at low light levels. The lengthened exposure time is moreover achieved without the need to alter the memory read-write control schedule.

Next, a third embodiment will be described.

Figure 12:
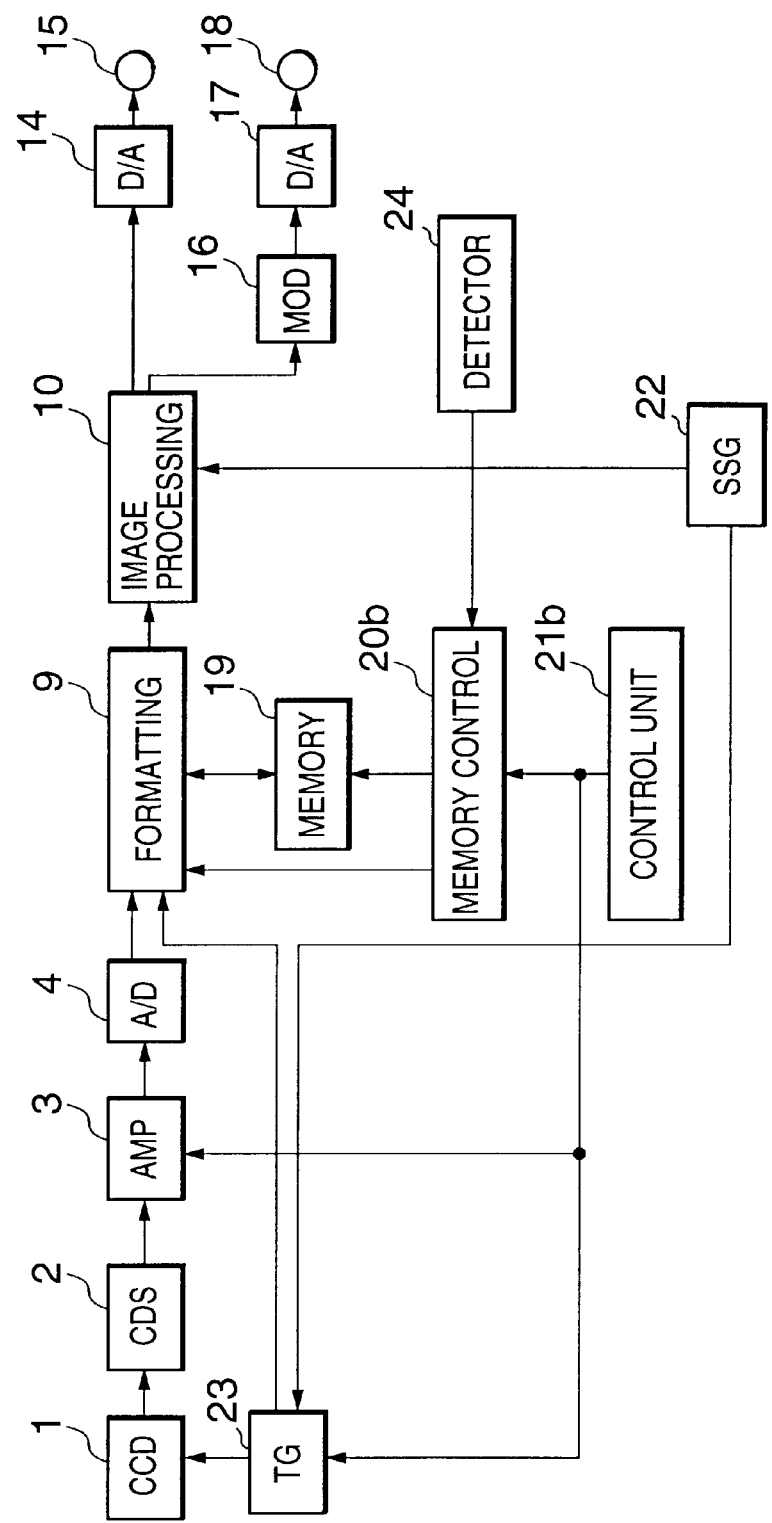
FIG. 12 is a more detailed block diagram of the video camera in FIG. 2, illustrating a third embodiment.

Referring to FIG. 12, the third embodiment adds a detector 24 to the configuration of the first embodiment, and alters the operation of the memory control circuit 20b and control unit 21b. The detector 24 detects an event such as the occurrence of a loud noise, a major change in image content, or the press of a 'save' button by a human operator of the apparatus, and responds by sending a save command or save signal to the memory control circuit 20b. The memory control circuit 20b then alters memory control as described below. The control unit 21b responds to the press of a 'recall' button by the human operator, also by altering memory control. The other elements operate as described in the first embodiment, but the memory circuit 19 now has a capacity equivalent to three frames, and is divided into a first memory area, a second memory area, and a third memory area, each storing one frame.

When the apparatus is powered up, the memory control circuit 20b operates as described in the first embodiment, using the first and second memory areas. The formatting circuit 9 writes frames of image data alternately to the first and second memory areas, and reads alternately from the second and first memory areas. When the memory control circuit 20b receives a save signal from the detector 24, it finishes writing the current frame to the current memory area, reads that frame from that memory area, then discontinues use of that memory area, and uses the other two memory areas alternately.

When the detector 24 is activated, if the memory control circuit 20b is generating write addresses in the second memory area and read addresses in the first memory area, for example, it continues to do so until the end of the current frame. During the next frame, the memory control circuit 20b generates write addresses in the first memory area and read addresses in the second memory. In the next frame after that, however, the memory control circuit 20b generates write addresses in the third memory area, and read addresses in the first memory area, discontinuing use of the second memory area. In the following frame, the memory control circuit 20b generates write addresses in the first memory area and read addresses in the third memory area. Thereafter, the memory control circuit 20b continues to read and write in the first and third memory areas alternately, leaving the image data stored in the second memory area intact, until the next save signal is received from the detector 24. The memory control circuit 20b also sets an internal flag (not visible) indicating whether the image data stored in the second memory area should be read in the normal mode or upside-down mode.

At any given time, the memory circuit 19 stores image data for the current frame, the preceding frame, and the last frame in which the detector 24 was activated. When the operator presses the 'recall' button, the control unit 21b commands the memory control circuit 20b to read the image data stored when the detector 24 was activated. In the example above, the memory control circuit 20b generates read addresses in the second memory area, where the saved image remains stored. The memory control circuit 20b generates read addresses in this memory area repeatedly, as long as the 'recall' button remains depressed, causing the saved image to be reproduced continuously as a still image on the monitor screen. If the saved image was stored while the video camera 30 was facing backward, the saved image data are read in the upside-down mode, so the image appears right-side up.

While the saved image is being reproduced, the memory control circuit 20b also generates write addresses in the other two memory areas alternately, and the storage of new image data in these memory areas continues without interruption. When the operator releases the 'recall' button the memory control circuit 20b returns to the reading of image data from the frame preceding the current frame, and the displayed image returns to the scene now being viewed by the video camera 30. The saved image remains saved.

The third embodiment enables the operator to see the image stored at a past event, and displays this image right-side up.

Next, a fourth embodiment will be described.

Figure 13:
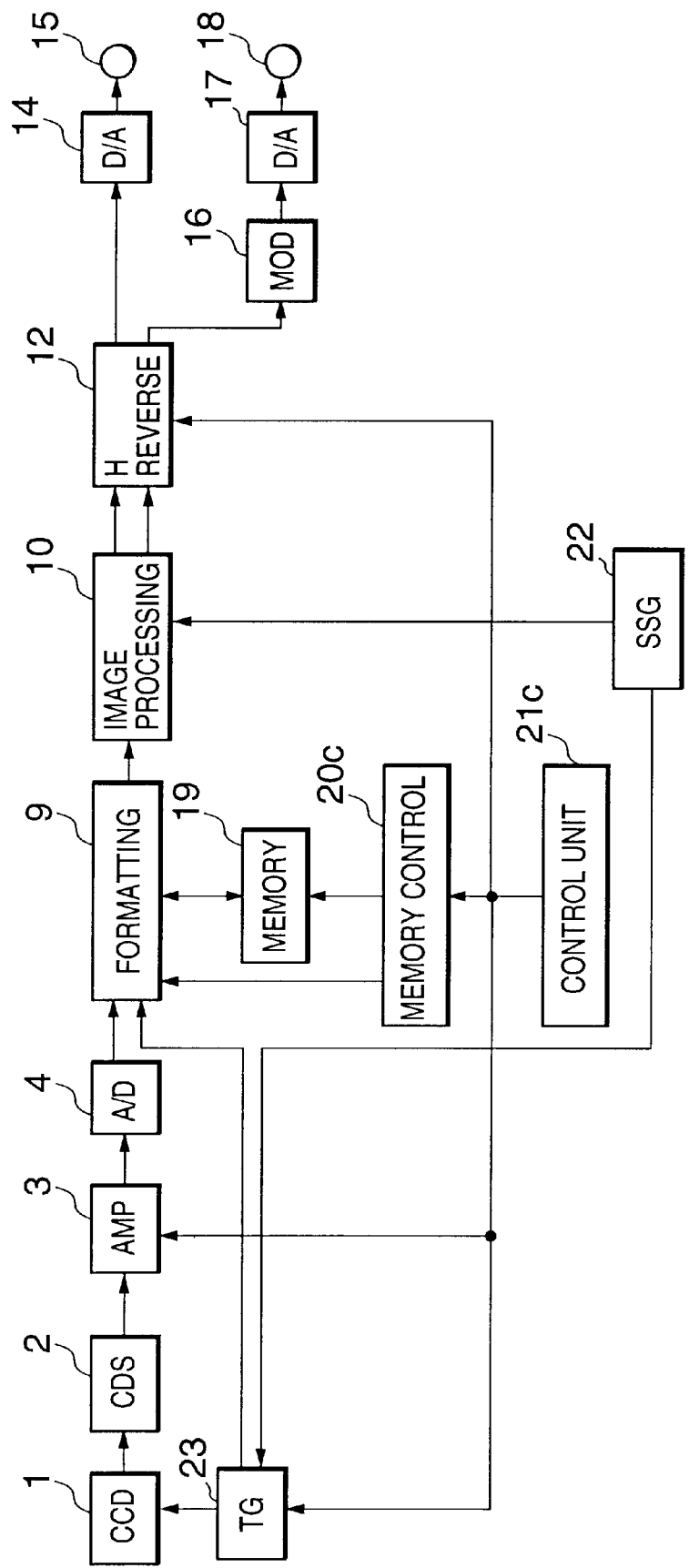
FIG. 13 is a more detailed block diagram of the video camera in FIG. 2, illustrating a fourth embodiment.

Referring to FIG. 13, the fourth embodiment adds a horizontal reversing circuit (H REVERSE) 12 to the configuration of the first embodiment, and modifies the operation of the memory control circuit 20c and control unit 21c. The other elements operate as in the first embodiment.

The control unit 21c designates the normal mode and upside-down mode as described in the first embodiment, but also supplies the mode signal to the horizontal reversing circuit 12. In both modes, the horizontal reversing circuit 12 receives the luminance and color-difference signals output by the image-processing circuit 10, and supplies these signals to the first digital-to-analog converter 14 and modulating circuit 16 with, for example, a one-line delay. In the upside-down mode, however, the horizontal reversing circuit 12 reverses the order of pixels in each horizontal line in the effective picture area.

In the normal mode, the memory control circuit 20c operates as in the first embodiment, generating read addresses in the same order as write addresses. In the upside-down mode, the memory control circuit 20c reverses the row order of the read addresses, without reversing the column order.

Figure 14:
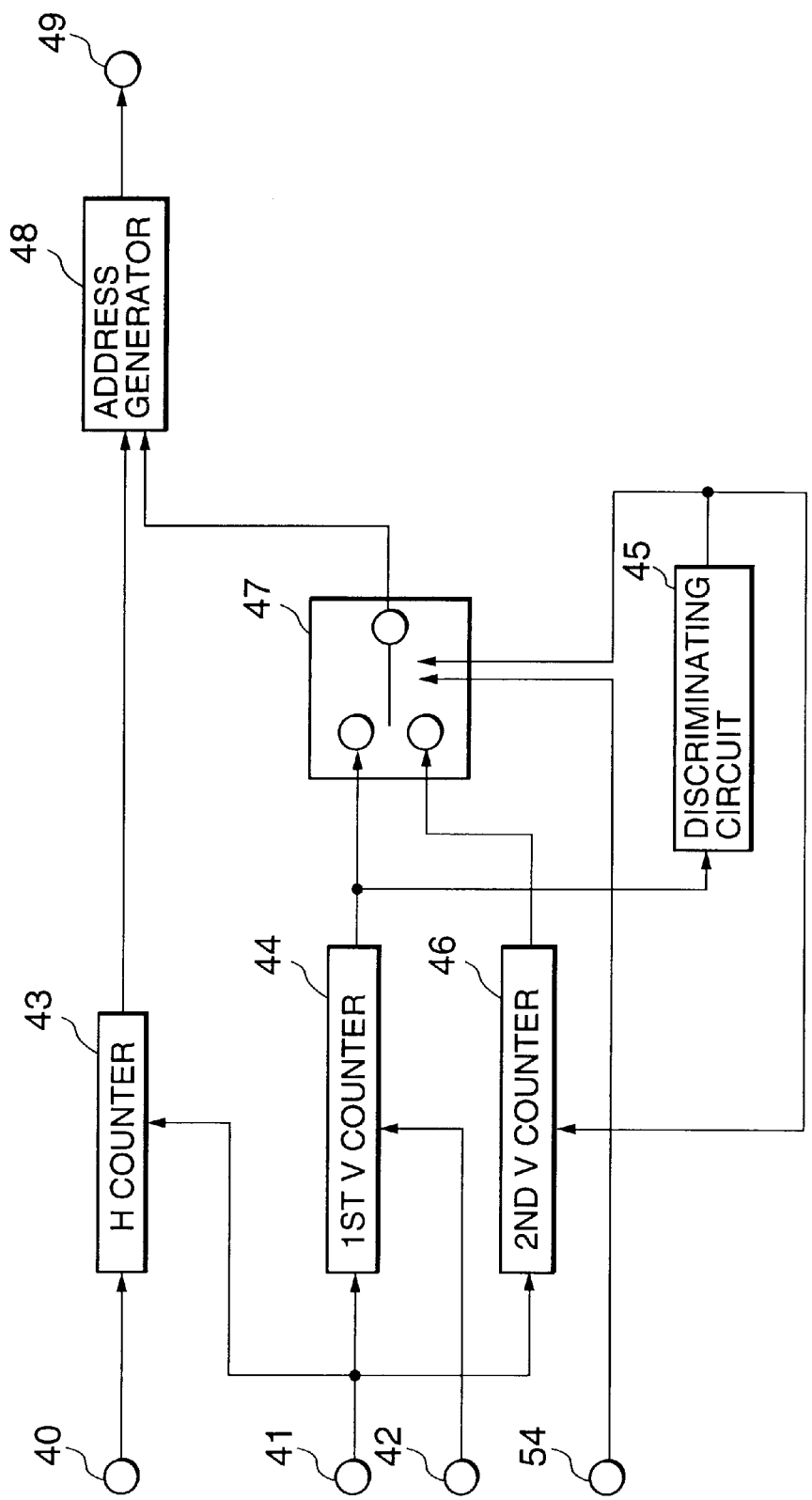
FIG. 14 is a more detailed block diagram of part of the memory control circuit in FIG. 13.

FIG. 14 shows an exemplary structure of the read address-generating portion of the memory control circuit 20c. This circuit has a clock input terminal 40, a horizontal synchronizing signal input terminal 41, a vertical synchronizing signal input terminal 42, a horizontal (H) counter 43 that counts pixels in each horizontal line, a first vertical counter 44 that counts horizontal lines, a discriminating circuit 45 that discriminates between effective picture lines and lines in the vertical blanking interval, a second vertical counter 46 that counts effective picture lines, a selector 47 that selects the line number output by the first vertical counter 44 or the second vertical counter 46, an address generator 48 that combines the line number selected by the 47 with the pixel number output by the horizontal counter 43 to generate a memory address, a memory address output terminal 49, and a mode input terminal 54 that receives the mode signal from the control unit 21c.

The horizontal counter 43 is reset by the horizontal synchronizing signal output by the synchronizing signal generator 22, and counts cycles of the clock signal received from the clock input terminal 40. The first vertical counter 44 is reset by the vertical synchronizing signal output from the synchronizing signal generator 22, and counts pulses of the horizontal synchronizing signal, counting up. The discriminating circuit 45 compares the line numbers output by the first vertical counter 44 with the line numbers at the top and bottom of the effective picture area, activates a discrimination signal when the line number output by the first vertical counter 44 enters the effective picture area, and deactivates the discrimination signal when the line number output by the first vertical counter 44 leaves the effective picture area.

The second vertical counter 46 is initialized by the discrimination signal at the top of the effective picture area, and counts horizontal synchronizing pulses, counting down. The initial value loaded into the second vertical counter at the top of the effective picture area is equal to the line number at the bottom of the effective picture area. The selector 47 is controlled by the combination of the mode signal received from the control unit 21c and the discrimination signal output by the discriminating circuit 45, selecting the first vertical counter 44 whenever the mode signal indicates the normal mode, also selecting the first vertical counter 44 whenever the discrimination signal indicates the vertical blanking interval, and selecting the second vertical counter 46 when the mode control signal indicates the upside-down mode and the discrimination signal simultaneously indicates the effective picture interval.

The operation of the fourth embodiment will be described for an exemplary case in which a field comprises ten lines of ten pixels each, the lines and pixels being numbered as illustrated in FIG. 4. In the following description, all ten rows of pixels belong to the effective picture area; the formatting circuit 9 does not store data for the horizontal and vertical blanking intervals.

In the normal mode, the memory control circuit 20c and horizontal reversing circuit 12 operate so that the output image has the same pixel arrangement as the input image. A field is stored in the memory circuit 19 in the order of pixels from zero to ninety-nine in FIG. 4, and read from the memory circuit 19 in the same order, as shown in FIG. 7. The horizontal reversing circuit 12 does not alter the order shown in FIG. 7.

In the upside-down mode, a field stored in the memory circuit 19 in the order shown in FIG. 4 is read from the memory circuit 19 in the order shown in FIG. 15. The memory control circuit 20c reverses the order of lines without reversing the order of pixels in each line. Thus the bottom line in FIG. 4, comprising pixels 90, 91, . . . , 99 and having row address nine, becomes the top line in FIG. 15, comprising the same pixels in the same order but now having row address zero. Similarly, line eight in FIG. 4 becomes line one in FIG. 15, line seven in FIG. 4 becomes line two in FIG. 15, and so on through line zero in FIG. 4, which becomes line nine in FIG. 15.

After the image field in FIG. 15 has been processed by the image-processing circuit 10 to generate luminance and color-difference signals, the horizontal reversing circuit 12 reverses the pixel order of these signals in each horizontal line. For example, the top line is changed from the order shown in FIG. 15 (90, 91, . . . , 98, 99) to the order shown in FIG. 8 (99, 98, . . . , 91, 90). The order of pixels in each other line is similarly reversed, without changing the order of lines. The signals supplied to the first digital-to-analog converter 14 and modulating circuit 16 thus have the same pixel arrangement as in the first embodiment, shown in FIG. 8.

If the formatting circuit 9 stores optical black data for the horizontal and vertical blanking intervals, there is no change in the operation in the normal mode. The data written to and read from the memory circuit 19 both have the pixel arrangement shown, for example, in FIG. 9, in which the dashed line encloses the effective picture area. In the upside-down mode, the memory control circuit 20c reverses the order of lines that are not disposed in the vertical blanking interval, producing the arrangement shown in FIG. 16, and the horizontal reversing circuit 12 reverses the horizontal order of pixels in the effective picture area, producing the pixel arrangement shown in FIG. 10.

Lines zero and one in FIG. 16, being in the vertical blanking interval, are read as written, the selector 47 in FIG. 14 selecting the first vertical counter 44. As indicated in FIG. 10, the horizontal reversing circuit 12 does not change the pixel order in these two lines.

In line two in FIG. 16, which is disposed at the top of the effective picture area, the selector 47 selects the second vertical counter 46, and the address generator 48 generates the addresses (80, 81, 82, . . . , 87, 88, 89) of the data in line eight, at the bottom of the effective picture area. The horizontal reversing circuit 12 then reverses the order of the pixels (82, . . . , 87, 88) disposed in the effective picture area, leaving the pixels (80, 81, 89) disposed outside the effective picture area unchanged, producing the pixel order (80, 81, 88, . . . , 83, 82, 89) shown in FIG. 10.

Lines three to eight are processed in the same way as line two, the memory control circuit 20c generating row addresses in descending order from line seven to line two, and the horizontal reversing circuit 12 reversing the horizontal order of pixels in the effective picture area in each line. Line nine, being in the vertical blanking interval, is read as written.

The fourth embodiment produces the same final pixel arrangement as the first embodiment, but waits until the image data have been processed by the image-processing circuit 10 to reverse the order of pixels in each horizontal line. This simplifies the internal structure of the image-processing circuit 10, because in each line, the image-processing circuit 10 receives the same sequence of red, green, and blue pixel data in the upside-down mode as in the normal mode. In each line, the image-processing circuit 10 always receives information for the three primary colors in the order determined by the color filters in the imaging device 1.

Next, a fifth embodiment will be described. The fifth embodiment adds a zoom function to the fourth embodiment.

Figure 17:
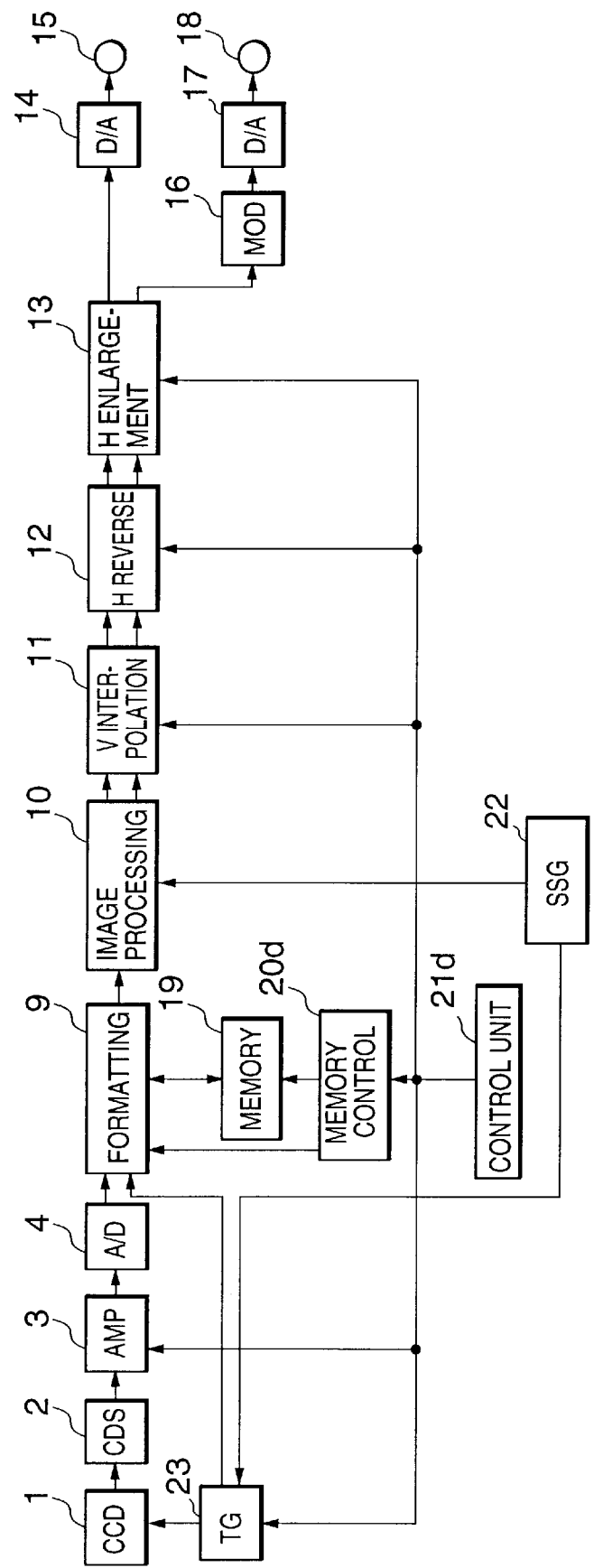
FIG. 17 is a more detailed block diagram of the video camera in FIG. 2, illustrating a fifth embodiment.

Referring to FIG. 17, the fifth embodiment modifies the operation of the memory control circuit 20d and control unit 21d in the fourth embodiment, provides a vertical (V) interpolation circuit 11 between the image-processing circuit 10 and horizontal reversing circuit 12, and provides a horizontal (H) enlargement circuit 13 on the output side of the horizontal reversing circuit 12. The other elements operate as described in the fourth embodiment.

Besides designating the normal and upside-down modes, the control unit 21d in the fifth embodiment responds to commands from the human operator to zoom in on a desired part of the picture. In the zoom mode, the control unit 21d supplies the vertical interpolation circuit 11 and horizontal enlargement circuit 13 with information designating the zoom ratio and the starting line and pixel of the area to be zoomed in on, referred to below as the zoom area.

In the zoom mode, vertical stretching of the picture creates missing lines in the luminance and color-difference signals output by the image-processing circuit 10. The vertical interpolation circuit 11 supplies the memory control circuit 20d with a one-bit read control signal that is inactive during the missing lines, and active during lines that are not missing. The vertical interpolation circuit 11 generates the read control signal on the basis of the zoom ratio and the starting line of the zoom area. In the zoom mode, the vertical interpolation circuit 11 interpolates new lines, by performing vertical linear interpolation, for example, to fill in the missing lines. This interpolation operation expands the zoom area so as to fill the effective picture area vertically. When the zoom function is not employed, the vertical interpolation circuit 11 passes the luminance and color-difference signals from the image-processing circuit 10 to the horizontal reversing circuit 12 without change, and leaves the read control signal constantly active.

The horizontal enlargement circuit 13 performs horizontal interpolation in the zoom mode, expanding the zoom area to fill the effective picture area horizontally. When the zoom function is not employed, the horizontal enlargement circuit 13 passes the luminance and color-difference signals from the horizontal reversing circuit 12 to the first digital-to-analog converter 14 and modulating circuit 16 without change.

The memory control circuit 20d generates write addresses as described in the first embodiment. Read addresses are generated as described below.

Figure 18:
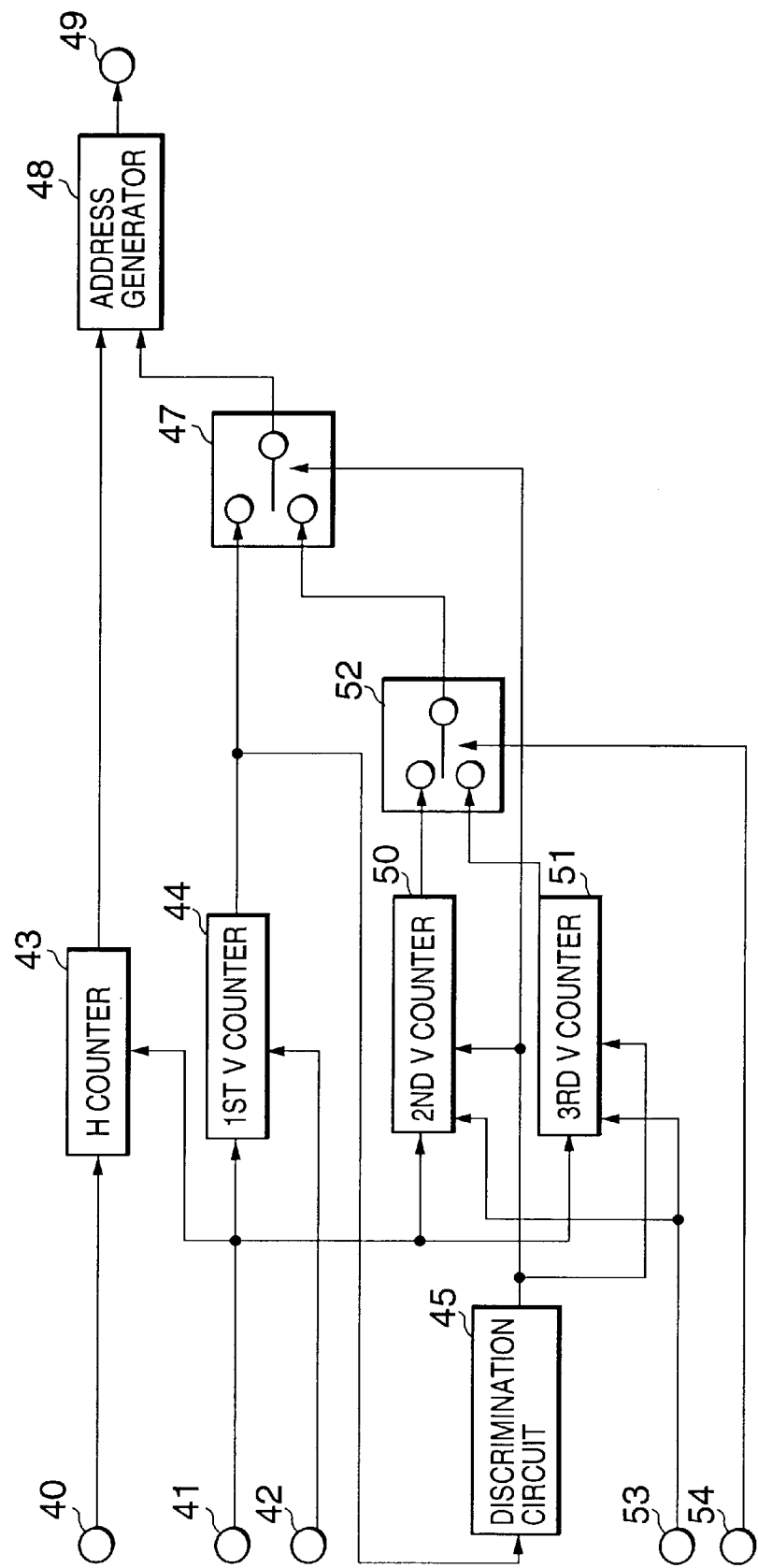
FIG. 18 is a more detailed block diagram of part of the memory control circuit in FIG. 17.

FIG. 18 shows an exemplary structure of the read address-generating portion of the memory control circuit 20d. The clock input terminal 40, horizontal synchronizing signal input terminal 41, vertical synchronizing signal input terminal 42, horizontal counter 43, first vertical counter 44, discriminating circuit 45, address generator 48, and mode signal input terminal 54 operate as described in the fourth embodiment. Also provided are two more vertical counters 50, 51, a pair of selectors 47, 52, and an input terminal 53 for the read control signal from the vertical interpolation circuit 11. The vertical counters 50, 51 receive the horizontal synchronizing signal, the read control signal, and the discrimination signal output by the discriminating circuit 45.

The second vertical counter 50 is reset by the discrimination signal, the line number of the top line in the zoom area being loaded into the second vertical counter 50 as an initial value when the discrimination signal indicates the top of the effective picture area. The second vertical counter 50 then counts lines by counting pulses of the horizontal synchronizing signal while the read control signal is active, counting up. The second vertical counter accordingly generates the line numbers in the zoom area in ascending numerical order, from top to bottom.

The third vertical counter 51 is also reset by the discrimination signal, the line number of the bottom line in the zoom area being loaded into the third vertical counter 51 as an initial value when the discrimination signal indicates the top of the effective picture area. The third vertical counter 51 also counts lines by counting pulses of the horizontal synchronizing signal while the read control signal is active, counting down. The third vertical counter accordingly generates the line numbers in the zoom area in descending numerical order, from bottom to top.

The first selector 52 operates according to the mode signal received from the control unit 21d at the mode input terminal 54, selecting the line number output by the second vertical counter 50 in the normal mode or normal zoom mode, and the line number output by the third vertical counter 51 in the upside-down mode or upside-down zoom mode. The second selector 47 operates according to the discrimination signal output by the discriminating circuit 45, selecting the line number output by the first vertical counter 44 in the vertical blanking interval and the line number output by the first selector 52 at other times.

In the normal mode, when the zoom function is not used, the zoom area is the same as the effective picture area. The first and second vertical counters 44, 50 generate identical line numbers in the effective picture area. The selectors 47, 52 select the first vertical counter 44 in the vertical blanking interval and the second vertical counter 50 in the vertical effective picture interval, but the result is the same as if the first vertical counter 44 were selected at all times, as in the fourth embodiment.

In the upside-down mode, when the zoom function is not used, the line number at the bottom of the zoom area is the same as the line number at the bottom of the effective picture area, and the third vertical counter 51 generates the same line numbers as generated by the second vertical counter 46 in the fourth embodiment. The selectors 52, 47 select these line numbers in the vertical effective picture interval, and select the line numbers output by the first vertical counter 44 in the vertical blanking interval.

Accordingly, when the zoom function is not used, the address generator 48 generates the same read addresses as in the fourth embodiment. Other operations are also carried out as in the fourth embodiment, the vertical interpolation circuit 11 and horizontal enlargement circuit 13 merely transmitting the signals input and output by the horizontal reversing circuit 12 without alteration.

Operations in the zoom mode will be described with reference to FIGS. 19 to 34. For simplicity, only operations on the luminance data will be described.

FIG. 19 illustrates a case in which the memory circuit 19 stores only data for the effective picture area, one field of which comprises ten lines of ten pixels each. The zoom area is a five-by-five area located in columns three to seven of lines two to six. When this field is written into the memory circuit 19, the entire field is stored, from pixel zero in the top left to pixel ninety-nine in the bottom right.

When this field is read from the memory circuit 19 in the normal zoom mode, the vertical interpolation circuit 11 activates the read control signal in even-numbered lines only. In the memory control circuit 20d, the first selector 52 selects the second vertical counter 50. In line zero, at the top of the effective picture area, the second vertical counter 50 is loaded with the value two, designating the line at the top of the zoom area, and the address generator 48 generates the memory addresses of the pixels in the second line (20, 21, ..., 29) as indicated in FIG. 20. In line one, the read control signal is inactive, so the second vertical counter 50 does not increment. The address generator 48 generates the same addresses again, but no signal is output to the vertical interpolation circuit 11 in this line. The read command signal issued by the memory control circuit 20d may be disabled while the read control signal is inactive.

In line three in FIG. 20, the read control signal becomes active again, so the second vertical counter 50 increments from two to three and the address generator 48 generates the memory addresses of the pixels in line three (30, 31, ..., 39), which the image-processing circuit 10 processes as line two. Continuing in this way, the memory control circuit 20d reads the data for lines four, five, and six from the memory circuit 19 into the formatting circuit 9, and the image-processing circuit 10 processes these lines as lines four, six, and eight of the output image.

Referring to FIG. 21, the vertical interpolation circuit 11 performs vertical interpolation to generate the missing lines one, three, five, and seven. For example, the vertical interpolation circuit 11 generates pixel values for line one by taking the mean of the corresponding pixel values in lines zero and two. Interpolated values are indicated by black dots in FIG. 21. Each black dot represents the mean value of the two pixel values above and below. Line nine at the bottom of the picture may be filled with optical black values. Alternatively, the pixel values from line eight can be copied into line nine. The data in FIG. 21 pass through the horizontal reversing circuit 12 without alteration and are supplied to the horizontal enlargement circuit 13.

Referring to FIG. 22, the horizontal enlargement circuit 13 discards the supplied data for columns zero, one, two, eight, and nine, which are disposed outside the zoom area, places the remaining zoom-area data in the even-numbered columns, and interpolates pixel values for the odd-numbered columns. In line zero, for example, the pixel in column one has a value obtained by taking the mean value of the pixels (23, 24) to the left and right. Column nine is left optically black. Alternatively, the pixel values from column eight can be copied into column nine, or interpolation can be carried out between the last column in the zoom area and the first column to the right of the zoom area.

The operations described above employ a horizontal and vertical zoom ratio of two, but similar processing can be carried out for other zoom ratios. For a zoom ratio of N, the vertical interpolation circuit 11 actives the read control signal for one out of N lines, where N is an arbitrary positive integer.

Next, operations in the upside-down zoom mode will be described, again using the field illustrated in FIG. 19.

Referring to FIG. 23, the vertical interpolation circuit 11 again activates the read control signal in even numbered lines. In the memory control circuit 20d, the first selector 52 selects the third vertical counter 51. In line zero, the third vertical counter 51 is loaded with the value six, designating the line at the bottom of the zoom area, and the address generator 48 generates the memory addresses of the pixels in line six (60, 61, ... , 69). In line two, the second vertical counter 50 decrements from six to five, and the address generator 48 generates the memory addresses of the pixels in line five (50, 51, ... , 59). Similarly, the data for lines four, three, and two are read from the memory circuit 19 to obtain image data for lines four, six, and eight.

Referring to FIG. 24, the vertical interpolation circuit 11 performs vertical interpolation as described above. The pixel values in line one, for example, are the mean values of the corresponding pixel values in lines zero and two.

Referring to FIG. 25, the horizontal reversing circuit 12 reverses the order of the pixel values in each horizontal line. Consequently, the zoom area is now located in columns two to six.

Referring to FIG. 26, the horizontal enlargement circuit 13 discards the supplied data for columns zero, one, seven, eight, and nine, which are outside the zoom area, places the zoom-area data in the even-numbered columns, and interpolates pixel values for the odd-numbered columns. In line zero, for example, the pixel in column one has a value obtained by taking the mean value of the pixels (67, 66) to the left and right. The end result in FIG. 26 is that the zoom area fills the screen, and the zoomed output image is displayed right-side-up, even though the video camera 30 was facing backward.

If the memory circuit 19 also stores optical black data for the horizontal and vertical blanking intervals, the above zoom operations are modified as follows. FIG. 27 shows an example in which the effective picture area is located in columns two to eight of lines two to eight, and the zoom area is located in columns three to six of lines three to six. The vertical interpolation circuit 11 activates the read control signal during the vertical blanking interval, and during even-numbered lines in the vertical effective picture interval.

In the normal zoom mode, the memory control circuit 20d generates read addresses as shown in FIG. 28. Lines zero and one are in the vertical blanking interval, so the selector 47 selects the first vertical counter 44, and the address generator 48 generates the addresses of the pixel data for lines zero and one (0, 1, ... , 19). In the vertical effective picture interval from line two to line eight, the selector 47 and first selector 52 select the second vertical counter 50, which generates the line numbers of the lines in the zoom area by counting up from three to six. The data for line three, at the top of the zoom area, are read as signal data for line two, at the top of the effective picture area. The data for line six, at the bottom of the zoom area, are read as signal data for line eight, at the bottom of the effective picture area. No signal data are read for the three odd-numbered lines in the effective picture area (lines three, five, and seven). In line nine, which is disposed in the vertical blanking interval, the selector 47 again selects the first vertical counter 44, and the address generator 48 generates the address of the optical black data in line nine.

Referring to FIG. 29, the vertical interpolation circuit 11 generates data for the missing lines (lines three, five, and seven) by interpolation. For example, the pixel values in line three are the mean values of the corresponding pixel values in lines two and four. The horizontal reversing circuit 12 passes the resulting pixel data to the horizontal enlargement circuit 13 without alteration.

Referring to FIG. 30, the horizontal enlargement circuit 13 operates only on the data in the effective picture area, comprising columns two to eight in lines two to eight. In this area, the horizontal enlargement circuit 13 discards the data for columns two, seven, and eight, which lie outside the zoom area, and expands the remaining zoom-area data to fill the effective picture area, interpolating new pixel values to fill the resulting gaps. For example, the pixel in column three, line two, is given the mean value of the pixels (33, 34) to the left and right.

In the upside-down zoom mode, the field in FIG. 27 is processed as shown in FIGS. 31 to 34. In the memory control circuit 20d, the first selector 52 selects the third vertical counter 51. Referring to FIG. 31, after receiving the data for lines zero and one in the vertical blanking interval, for line two, the vertical interpolation circuit 11 receives the data (60, 61, ... , 69) stored as line six in the memory circuit 19. For lines three, five, and seven, the vertical interpolation circuit 11 receives no data. For lines four, six, and eight, the vertical interpolation circuit 11 receives the data stored as lines five, four, and three in the memory circuit 19. For line nine, in the vertical blanking interval, the vertical interpolation circuit 11 receives the line-nine data stored in the memory circuit 19.

Referring to FIG. 32, the vertical interpolation circuit 11 performs vertical interpolation to supply data for the three missing lines. Referring to FIG. 33, the horizontal reversing circuit 12 reverses the pixel order in each horizontal line within the effective picture area, without changing the order of any pixels outside the effective picture area. As a result, the zoom area now occupies columns four to seven. Referring to FIG. 34, the horizontal enlargement circuit 13 expands the zoom area to fill the effective picture area horizontally, using horizontal interpolation to generate new pixel values in columns three, five, and seven. The zoom area is displayed right-side up.

The fifth embodiment enables the operator to zoom in on a desired part of the picture, while continuing to see the picture right-side-up, regardless of whether the video camera 30 is facing forward or backward.

The interpolation operations performed by the vertical interpolation circuit 11 and horizontal enlargement circuit 13 are not limited to linear interpolation. Other interpolation techniques, such as zero-order hold interpolation, or averaging weighted by the square of the distance, can also be employed.

As described above, the invention enables the displayed picture to be kept right-side up while the video camera swivels on a horizontal axis to look forward, downward, and backward, without requiring the use of a rotating mount to rotate the video camera about its optic axis. As a result, the imaging apparatus becomes more compact and less expensive, and the dizzying effect produced by rotation of the picture on the screen is eliminated.

When the camera faces backward, the invention keeps the picture right-side up by writing the image data into a memory in one order, and reading the data out of the memory in another order. In a color imaging system, this operation is preferably performed before the separation of the luminance and color-difference signals, thus reducing the memory requirements. If the color system includes a color identification signal, this signal is preferably also stored in the memory, ensuring that the correct color-difference signal is generated in each line.

The invention also permits the image data to be read from the memory in different orders for different image-processing purposes. In particular, the image data can be read in the normal order for noise-reduction processing, and in a reverse order for righting of the image when the video camera is upside-down. Using the same memory for both processes reduces circuit size and saves power. A further consequence is that, in an imaging system that already uses a memory for a purpose such as noise reduction, the invention can be practiced by a modification of the memory control scheme, without the need to add more memory.

The invention can also be combined with a zoom function, which is implemented by reading selected lines of image data from the memory and interpolating to fill in the missing lines; with a slow-shutter function, which is implemented by reading data from the memory to fill in missing fields; or with a frame-saving function, which is implemented by leaving a frame stored in one memory area while using other memory areas for read and write access. Here too, the use of the same memory for different purposes reduces circuit size and saves power.

A few variations of the above embodiments have been mentioned, but further variations are possible. In a variation of the fifth embodiment, for example, the positions of the image-processing circuit 10 and vertical interpolation circuit 11 are interchanged, so that vertical interpolation is performed on the red-green-blue image signal, before the luminance and color-difference signals are generated. Depending on the arrangement of color filters in the imaging device 1, this may simplify the generation of the color-difference information.

In a variation of the first, third, fourth, and fifth embodiments, the delay between the writing and reading of a field is shortened from one frame to one field. The first, fourth, and fifth embodiments can then be practiced using a memory circuit 19 that stores only one frame, instead of two.

Alternatively, the memory capacity can be increased to more than the two or three frames mentioned in the embodiments. In the third embodiment, multiple image frames can be saved if additional memory capacity is provided.

The invention is not restricted to any particular method of coding color information. Any version of the NTSC (National Television System Committee), PAL (phase alternation by line), or SECAM (sequentiel couleur avec memoire) method may be used. The invention can also be practiced in monochrome imaging apparatus, and in imaging apparatus that uses a progressive scanning system instead of interlaced scanning.

The imaging device 1 need not be a charge-coupled device. An imaging device of the electronic retinal type or any other type may be used instead.

Those skilled in the art will recognize that still further variations are possible within the scope claimed below.

What is claimed is:

1. An imaging apparatus, comprising:
   an imaging device operating in different orientations, producing a source image that is right-side up when said imaging device operates in one orientation and upside-down when said imaging device operates in another orientation;
   a control unit coupled to said imaging device, generating a mode signal designating a first mode when said source image is right-side up and a second mode when said source image is upside down;
   a memory circuit coupled to said imaging device, storing said source image; and
   a memory control circuit coupled to said memory circuit and said control unit, reading said source image from said memory circuit in a first order in said first mode and in a second order, different from said first order, in said second mode, thereby generating an output image that is right-side up in both said first mode and said second mode, wherein said first mode transitions to said second mode while generating said output image, wherein said imaging device swivels on a horizontal axis so that the imaging device looks forward, downward, and then backward, and the transition between the first mode and the second mode takes place when the imaging device is looking directly downward.

2. The imaging apparatus of claim 1, further comprising an image-processing circuit that processes said output image by separating a luminance signal from color-difference signal.

3. The imaging apparatus of claim 2, wherein said memory circuit also stores a color identification signal, and-said image-processing circuit uses said color identification signal in generating said color-difference signal.

4. The imaging apparatus of claim 1, wherein said memory control circuit also reads said source image from said memory circuit in said first order, in both said first mode and said second mode, to generate an internal image, further comprising an internal processing circuit that uses said internal image for processing of said source image.

5. The imaging apparatus of claim 1, wherein:
   said memory circuit comprises a plurality of memory areas, each capable of storing said source image;
   said memory control circuit receives a save command and a recall command;
   said memory control circuit responds to the save command by leaving the source image currently produced by said imaging device stored in one of said memory areas, and storing each subsequent source image produced by said imaging device in another of said memory areas; and
   said memory control circuit responds to the recall command by reading the source image stored in said one of said memory areas.

6. The imaging apparatus of claim 1, wherein said control unit also designates a zoom mode, and said memory control circuit modifies said first order and said second order by omitting parts of said source image in said zoom mode, further comprising an interpolating circuit for expanding said output image in said zoom mode.

7. An imaging apparatus, comprising:
   an imaging device operating in different orientations, producing a source image that is right-side up when said imaging device operates in one orientation and upside-down when said imaging device operates in another orientation;
   a control unit coupled to said imaging device, generating a mode signal designating a first mode when said source image is right-side up and a second mode when said source image is upside down;
   a memory circuit coupled to said imaging device, storing said source image; and
   a memory control circuit coupled to said memory circuit and said control unit, reading said source image from said memory circuit in a first order in said first mode and in a second order, different from said first order, in said second mode, thereby generating an output image that is right-side up in both said first mode and said second mode;
   wherein said memory control circuit also reads said source image from said memory circuit in said first order, in both said first mode and said second mode, to generate an internal image, further comprising an internal processing circuit that uses said internal image for processing of said source image;

wherein said internal processing circuit combines said internal image with said source image, thereby reducing noise in said source image.

8. An imaging apparatus, comprising:

an imaging device operating in different orientations, producing a source image that is right-side up when said imaging device operates in one orientation and upside-down when said imaging device operates in another orientation;

a control unit coupled to said imaging device, generating a mode signal designating a first mode when said source image is right-side up and a second mode when said source image is upside down;

a memory circuit coupled to said imaging device, storing said source image; and a memory control circuit coupled to said memory circuit and said control unit, reading said source image from said memory circuit in a first order in said first mode and in a second order, different from said first order, in said second mode, thereby generating an output image that is right-side up in both said first mode and said second mode;

wherein said memory control circuit also reads said source image from said memory circuit in said first order, in both said first mode and said second mode, to generate an internal image, further comprising an internal processing circuit that uses said internal image for processing of said source image;

wherein said internal processing circuit uses said internal image to interpolate missing portions of said source image.

9. A method of processing a source image produced by an imaging device operating in different orientations, the source image being right-side up when the imaging device operates in one orientation and upside-down when the imaging device operates in another orientation, comprising the steps of:

storing the source image in a memory circuit;

reading the source image from said memory circuit in a first order if the source image is right-side up, and in a second order, vertically reverse to said first order, if the source image is upside down, thereby generating an output image that is right-side up by transitioning between said first order and said second order; and swiveling said imaging device on a horizontal axis so that the imaging device looks forward, downward and then backward, and the transitioning step between the first mode and the second mode takes place when the imaging device is looking directly downward.

10. The method of claim 9, wherein said second order is also horizontally reverse to said first order.

11. The method of claim 9, wherein said second order is not horizontally reverse to said first order, further comprising the steps of:

processing said output image to generate a luminance signal and a color-difference signal;

reversing said luminance signal horizontally, if said source image is upside-down; and reversing said color-difference signal horizontally, if said source image is upside-down.

12. The method of claim 9, further comprising the steps of:

reading the source image from said memory circuit in said first order, both when said source image is right-side up and when said source image is upside down, thereby generating an internal image; and using said internal image to process said source image.

13. The method of claim 9, wherein said memory circuit has a plurality of memory areas, further comprising the steps of:

receiving a save command;

responding to said save command by leaving the source image currently produced by said imaging device stored in one of said memory areas;

storing subsequent source images produced by said imaging device in another of said memory areas;

receiving a recall command; and responding to said recall command by reading the source image stored in said one of said memory areas, thereby reproducing the source image stored therein.

14. The method of claim 9, further comprising the steps of:

modifying said first order and said second order by omitting certain parts of said source image; and interpolating picture elements between remaining parts of said source image, thereby expanding part of said output image.

15. A method of processing a source image produced by an imaging device operating in different orientations, the source image being right-side up when the imaging device operates in one orientation and upside-down when the imaging device operates in another orientation, comprising the steps of:

storing the source image in a memory circuit; and reading the source image from said memory circuit in a first order if the source image is right-side up, and in a second order, vertically reverse to said first order, if the source image is upside down, thereby generating an output image that is right-side up by transitioning between said first order and said second order;

reading the source image from said memory circuit in said first order, both when said source image is right-side up and when said source image is upside down, thereby generating an internal image; and using said internal image to process said source image;

wherein said step of using said internal image comprises combining said internal image with said source image to reduce noise in said source image.

16. A method of processing a source image produced by an imaging device operating in different orientations, the source image being right-side up when the imaging device operates in one orientation and upside-down when the imaging device operates in another orientation, comprising the steps of:

storing the source image in a memory circuit; and reading the source image from said memory circuit in a first order if the source image is right-side up, and in a second order, vertically reverse to said first order, if the source image is upside down, thereby generating an output image that is right-side up by transitioning between said first order and said second order;

reading the source image from said memory circuit in said first order, both when said source image is right-side up and when said source image is upside down, thereby generating an internal image; and using said internal image to process said source image, wherein said step of using said internal image comprises using said internal image to interpolate missing parts of said source image.

* * * * *